July 9, 1957 M. S. MERRILL ET AL 2,798,379
APPARATUS FOR DETERMINING THE UNBALANCE OF
A ROTATING BODY IN SITU
Filed May 7, 1951 13 Sheets-Sheet 1
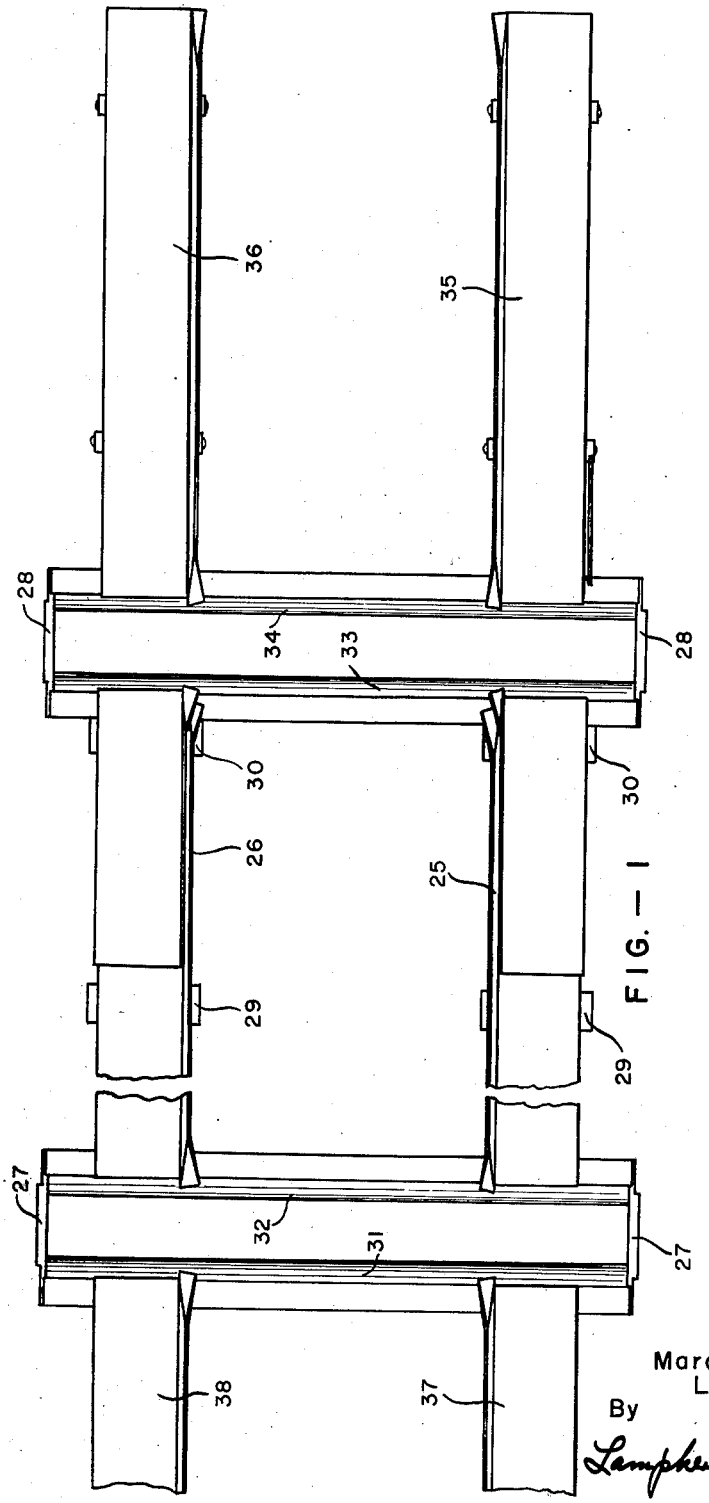
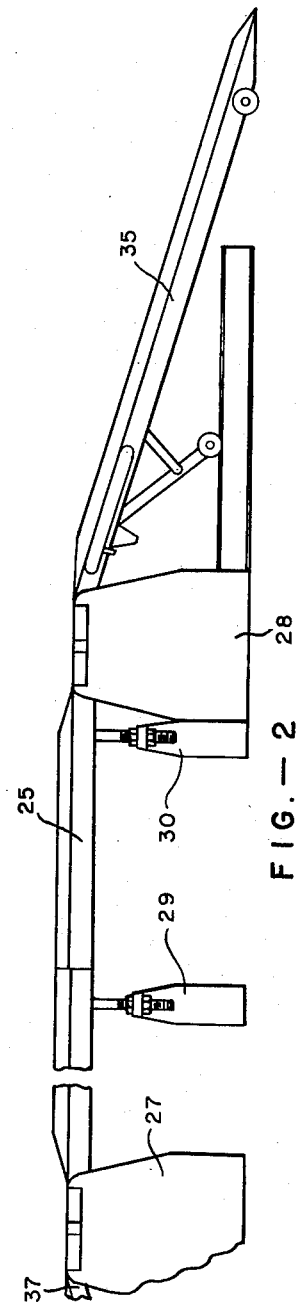
INVENTORS
Marcellus S. Merrill &
Lowell H. Erickson
By
*Lamphere and Van Valkenburgh*
ATTORNEYS

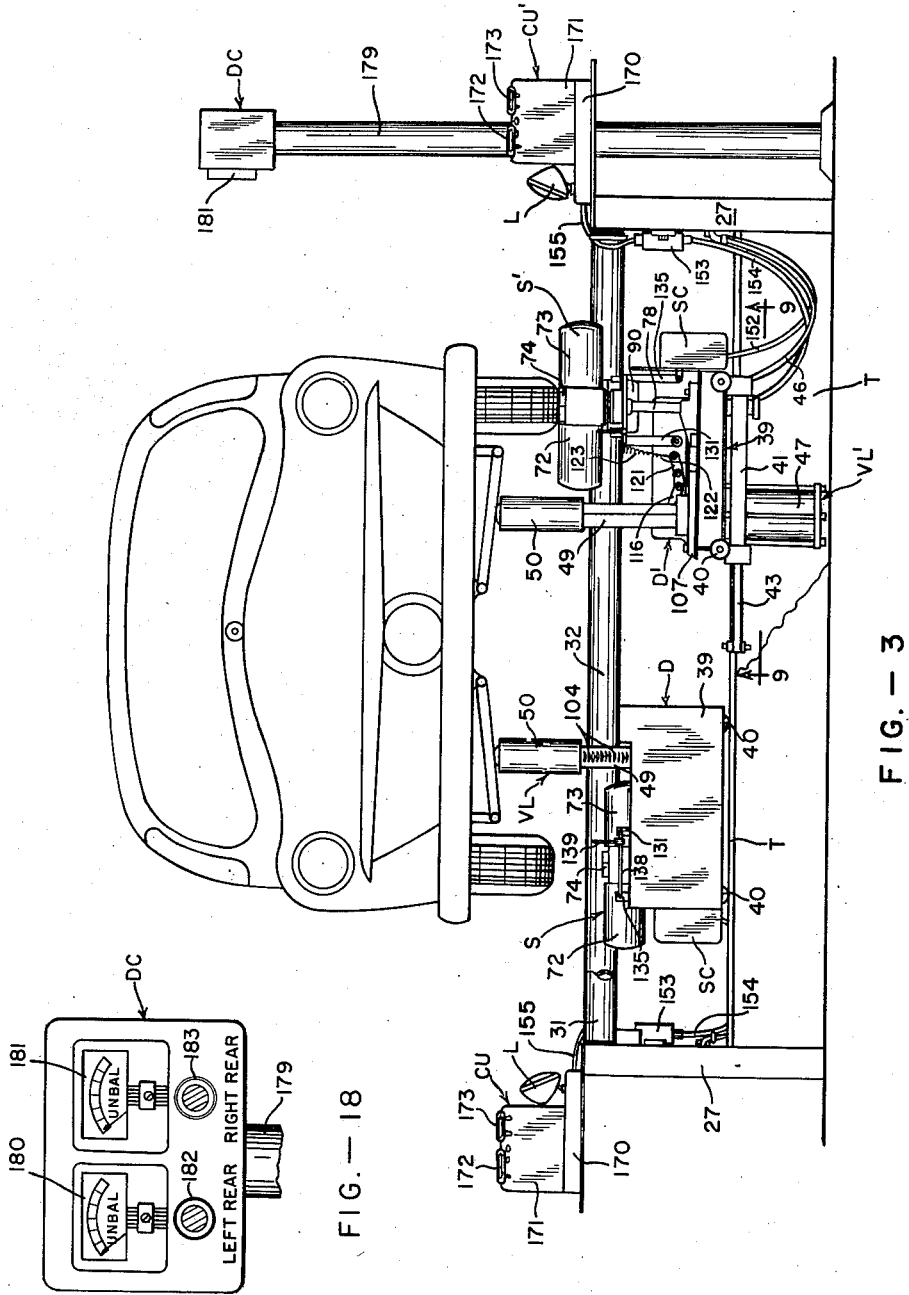

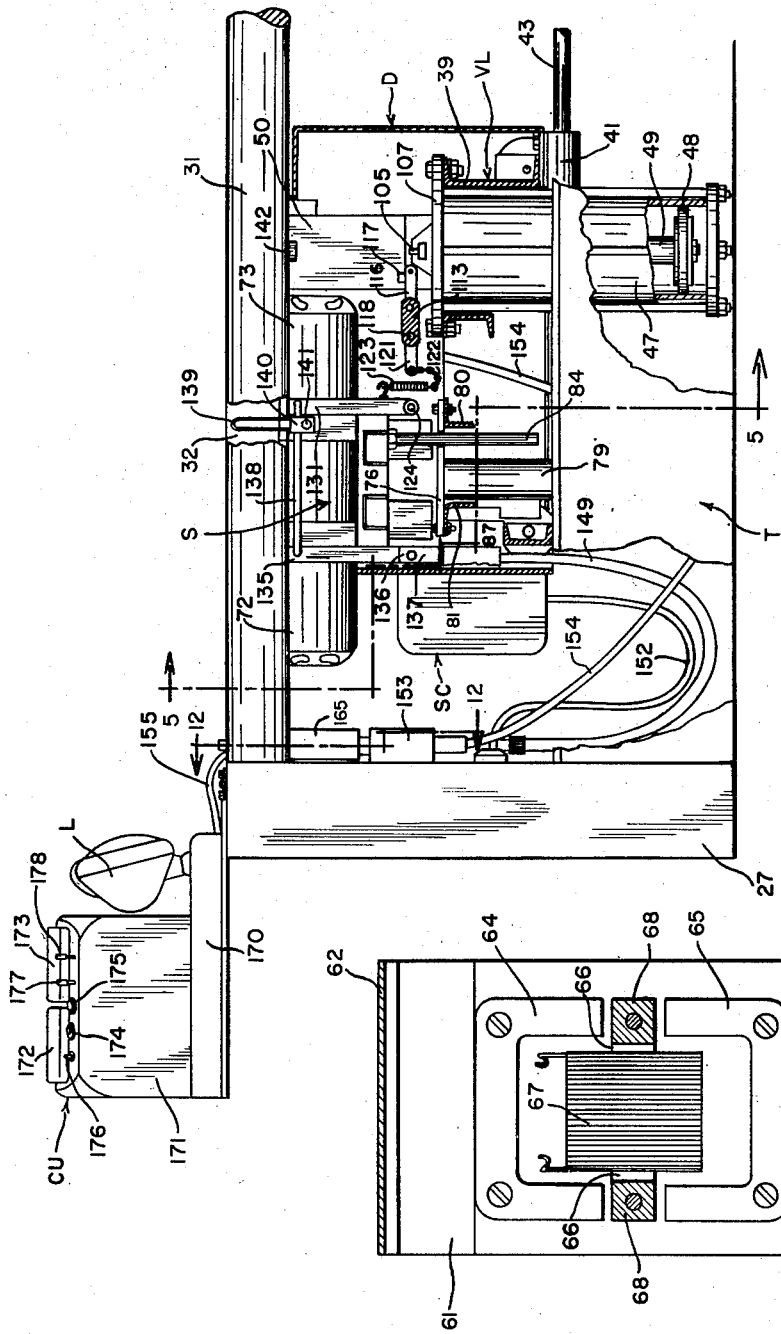

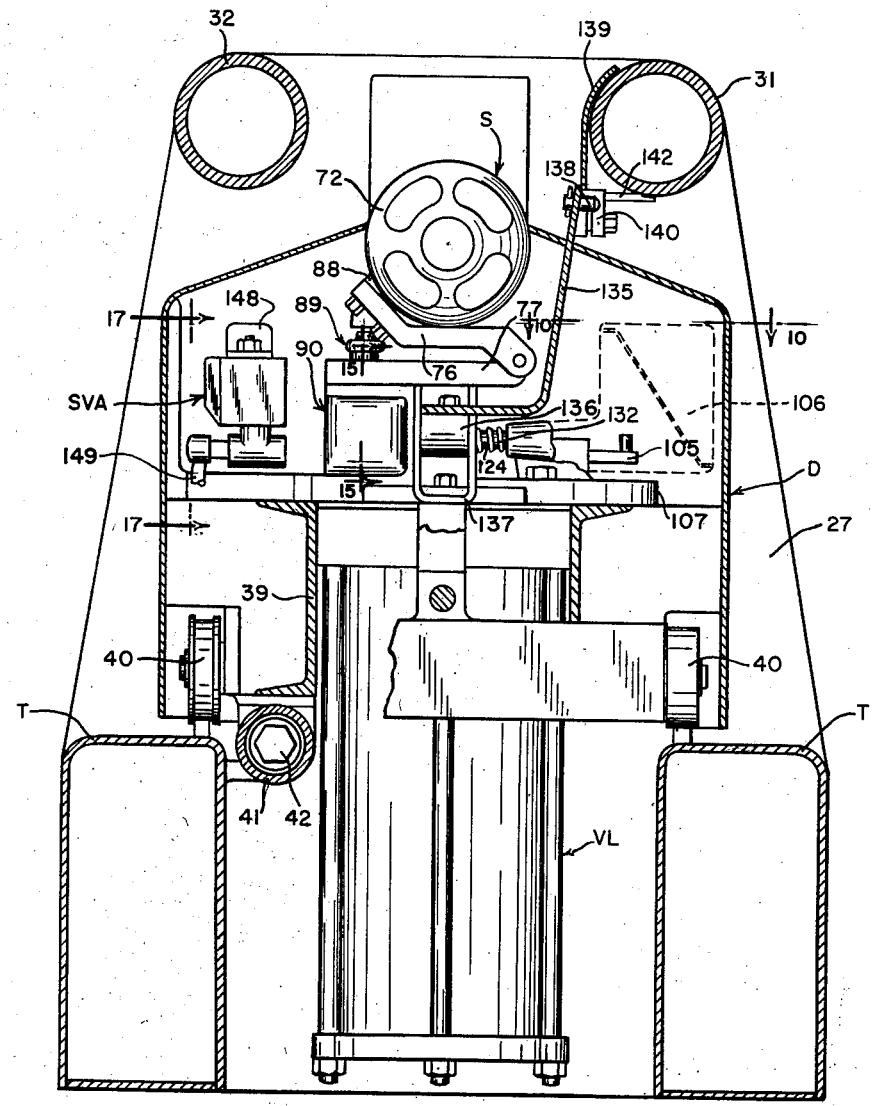
FIG. — 5

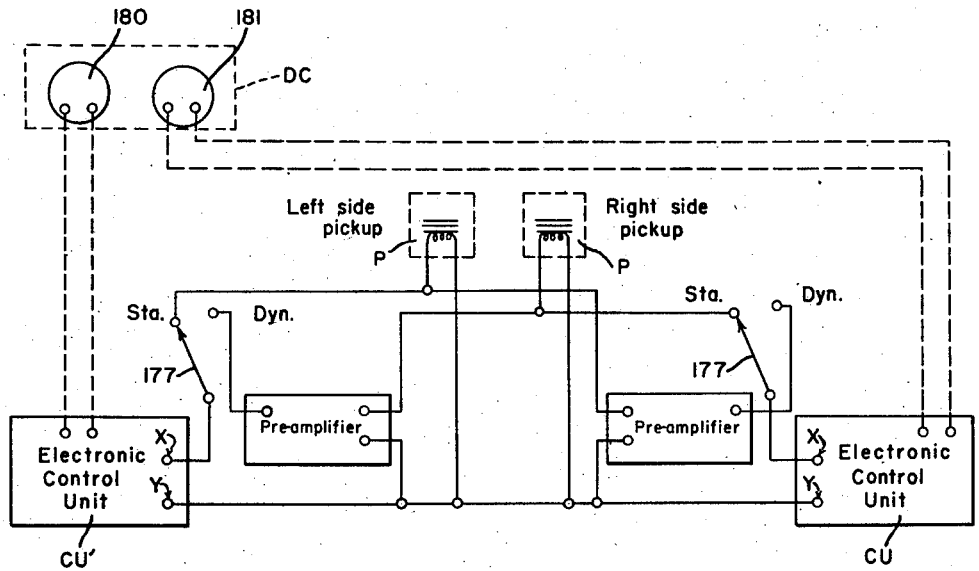
FIG. — 19
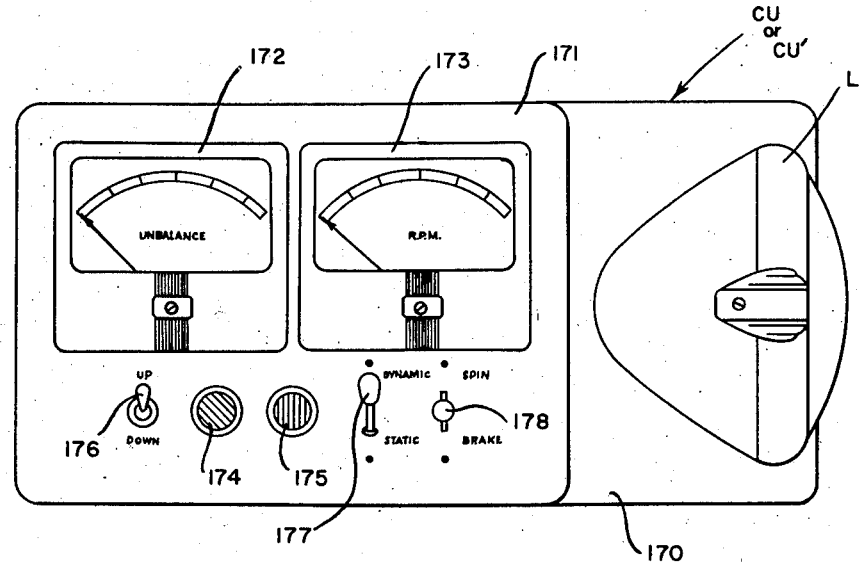
FIG. — 6
INVENTORS
Marcellus S. Merrill &
Lowell H. Erickson
ATTORNEYS

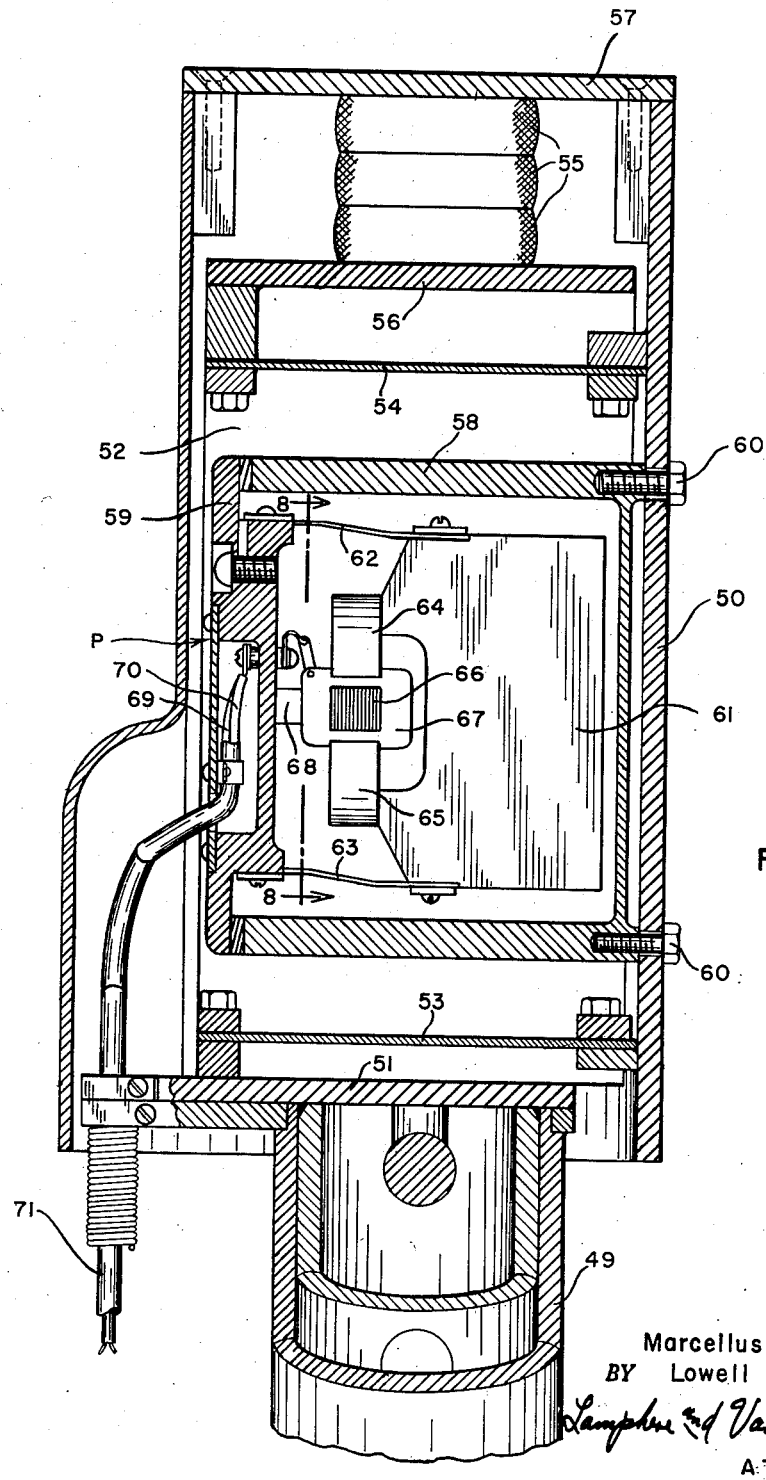
FIG.—7
INVENTORS
Marcellus S. Merrill &
Lowell H. Erickson
BY
Lampheus and Van Valkenburgh
ATTORNEYS

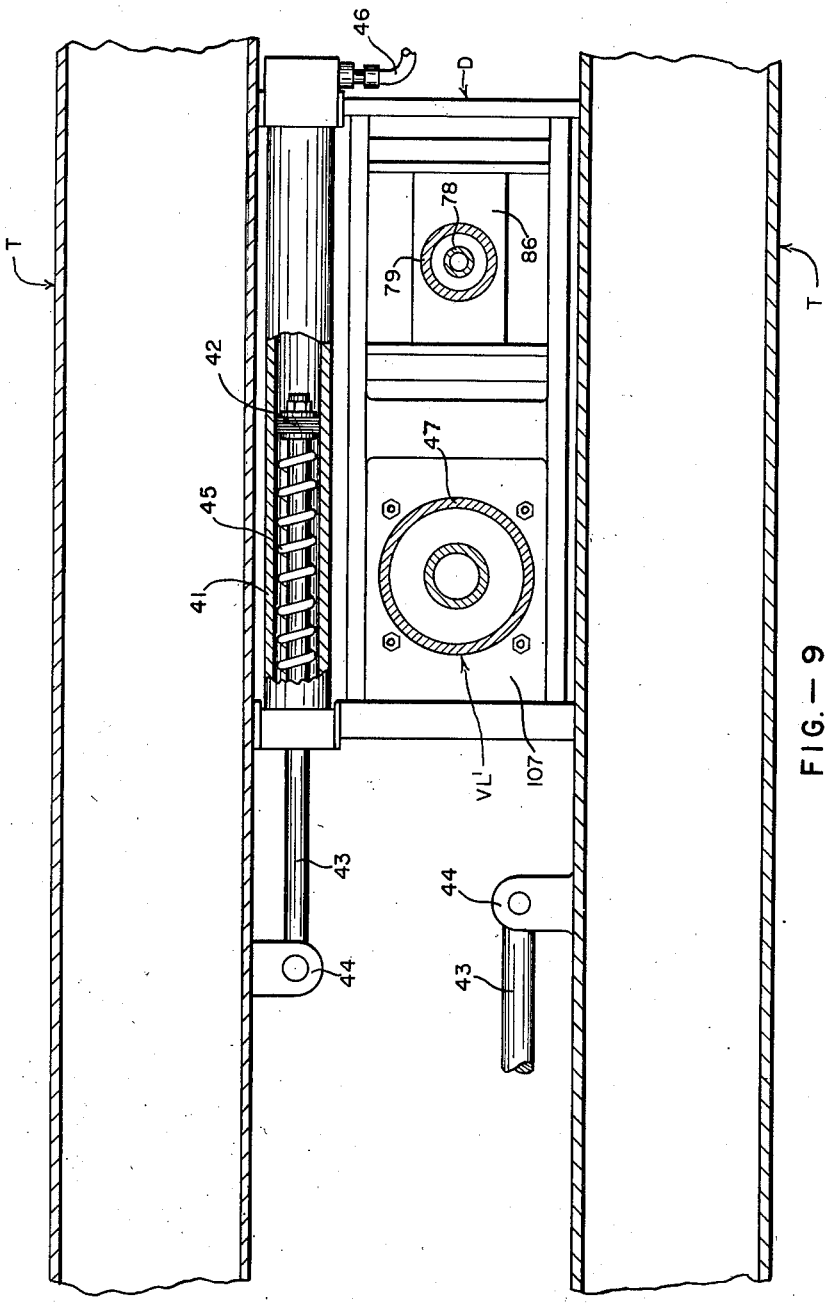

July 9, 1957
M. S. MERRILL ET AL
2,798,379
APPARATUS FOR DETERMINING THE UNBALANCE OF
A ROTATING BODY IN SITU
Filed May 7, 1951
13 Sheets-Sheet 8
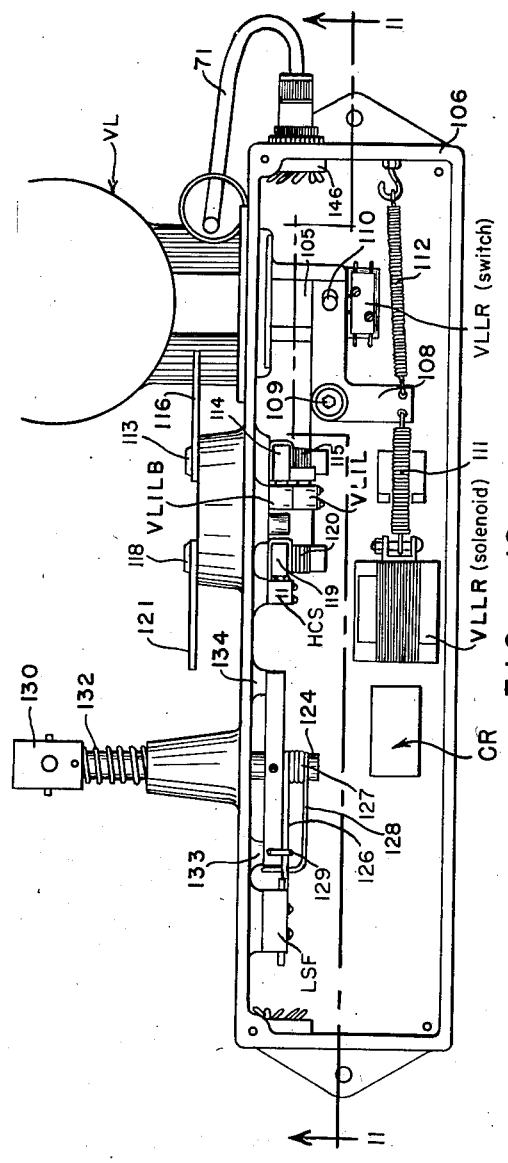
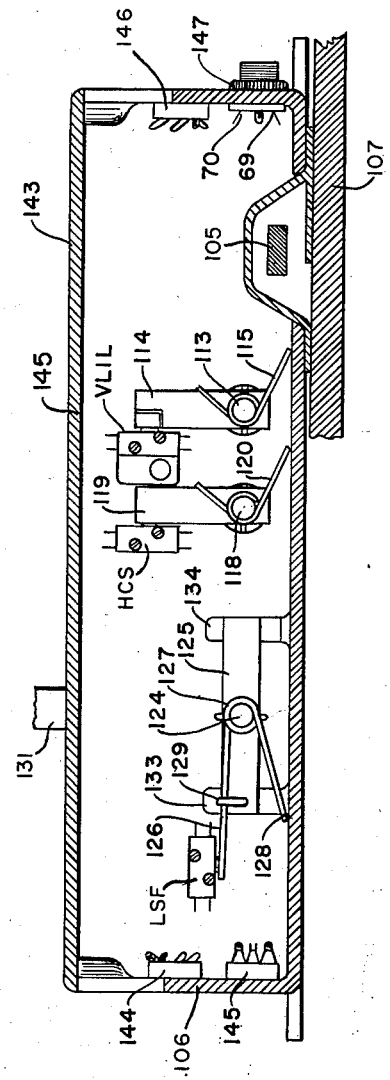
*INVENTORS*
Marcellus S. Merrill &
Lowell H. Erickson
BY
*Lamphere and Van Valkenburgh*
ATTORNEYS

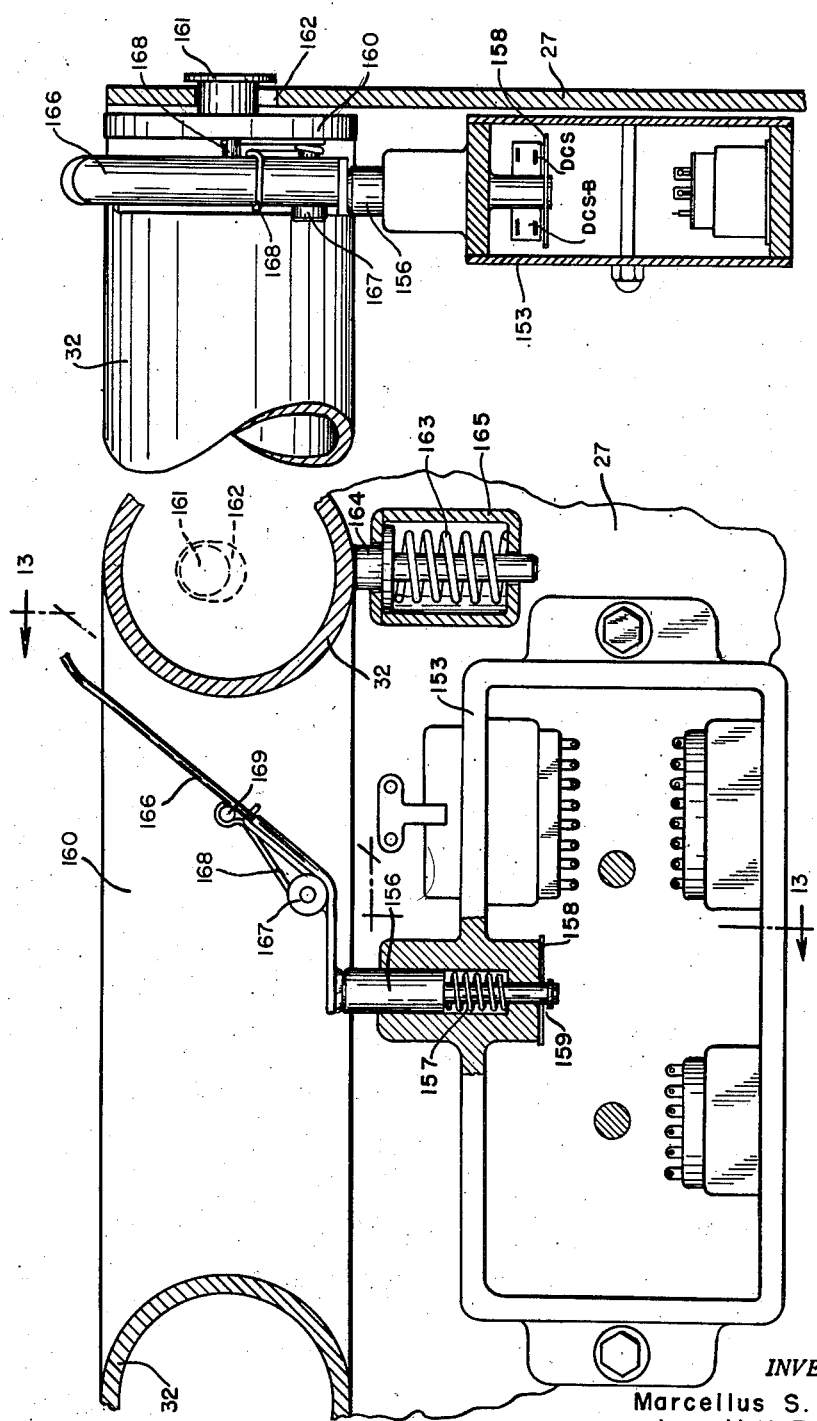

July 9, 1957   M. S. MERRILL ET AL   2,798,379
APPARATUS FOR DETERMINING THE UNBALANCE OF
A ROTATING BODY IN SITU
Filed May 7, 1951   13 Sheets-Sheet 10
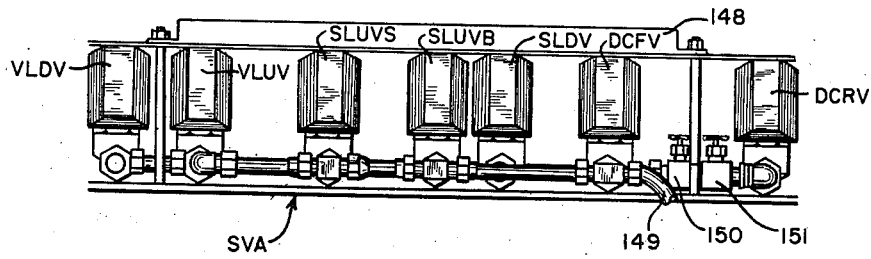
FIG. — 17
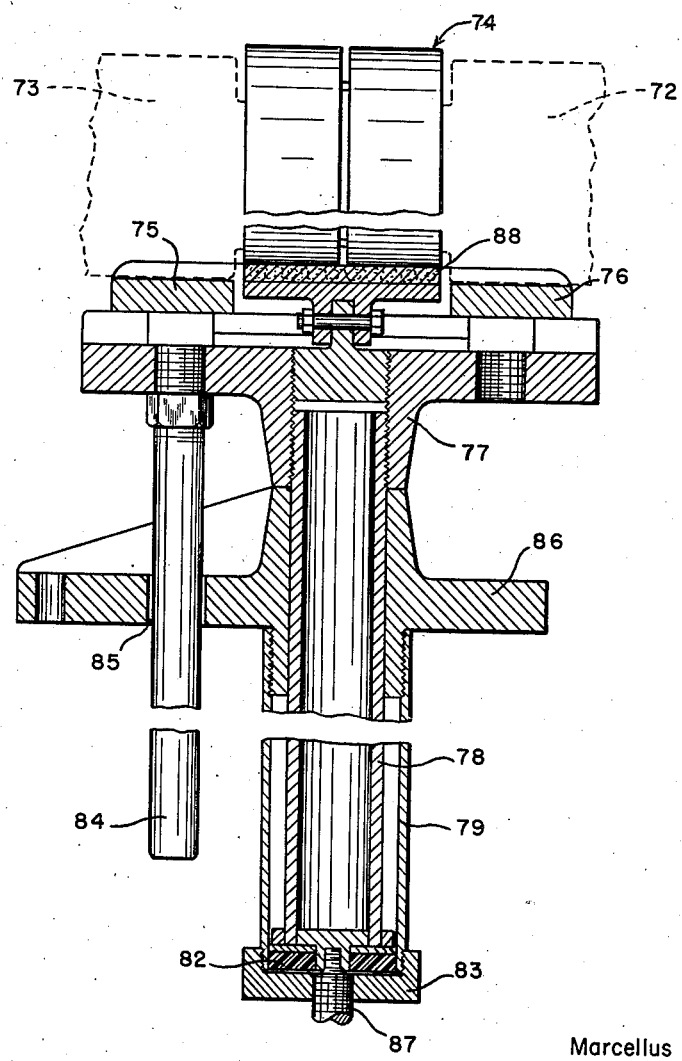
FIG. — 14
*INVENTORS*
Marcellus S. Merrill &
Lowell H. Erickson
BY
ATTORNEYS July 9, 1957
M. S. MERRILL ET AL
2,798,379
APPARATUS FOR DETERMINING THE UNBALANCE OF
A ROTATING BODY IN SITU
Filed May 7, 1951
13 Sheets-Sheet 11
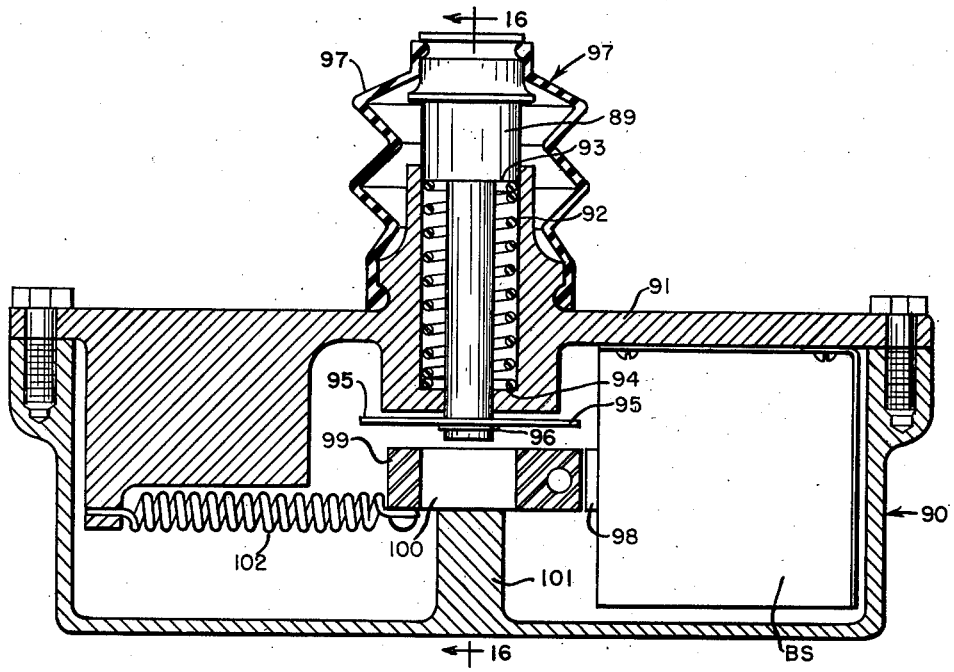
FIG.—15
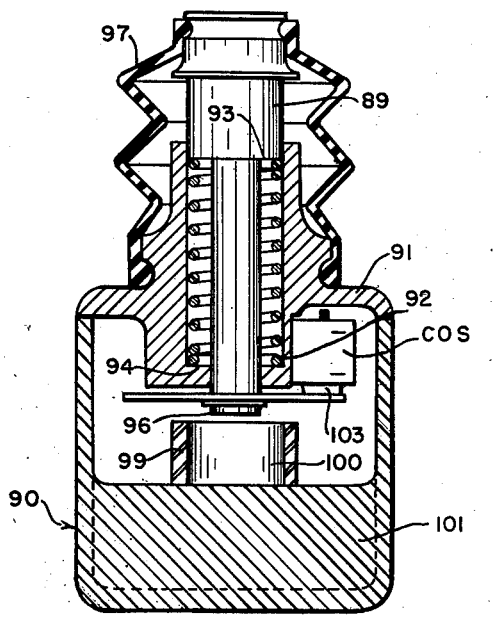
FIG.—16
*INVENTOR.*
Marcellus S. Merrill &
By  Lowell H. Erickson
*Lamphere and Van Valkenburgh*
ATTORNEYS

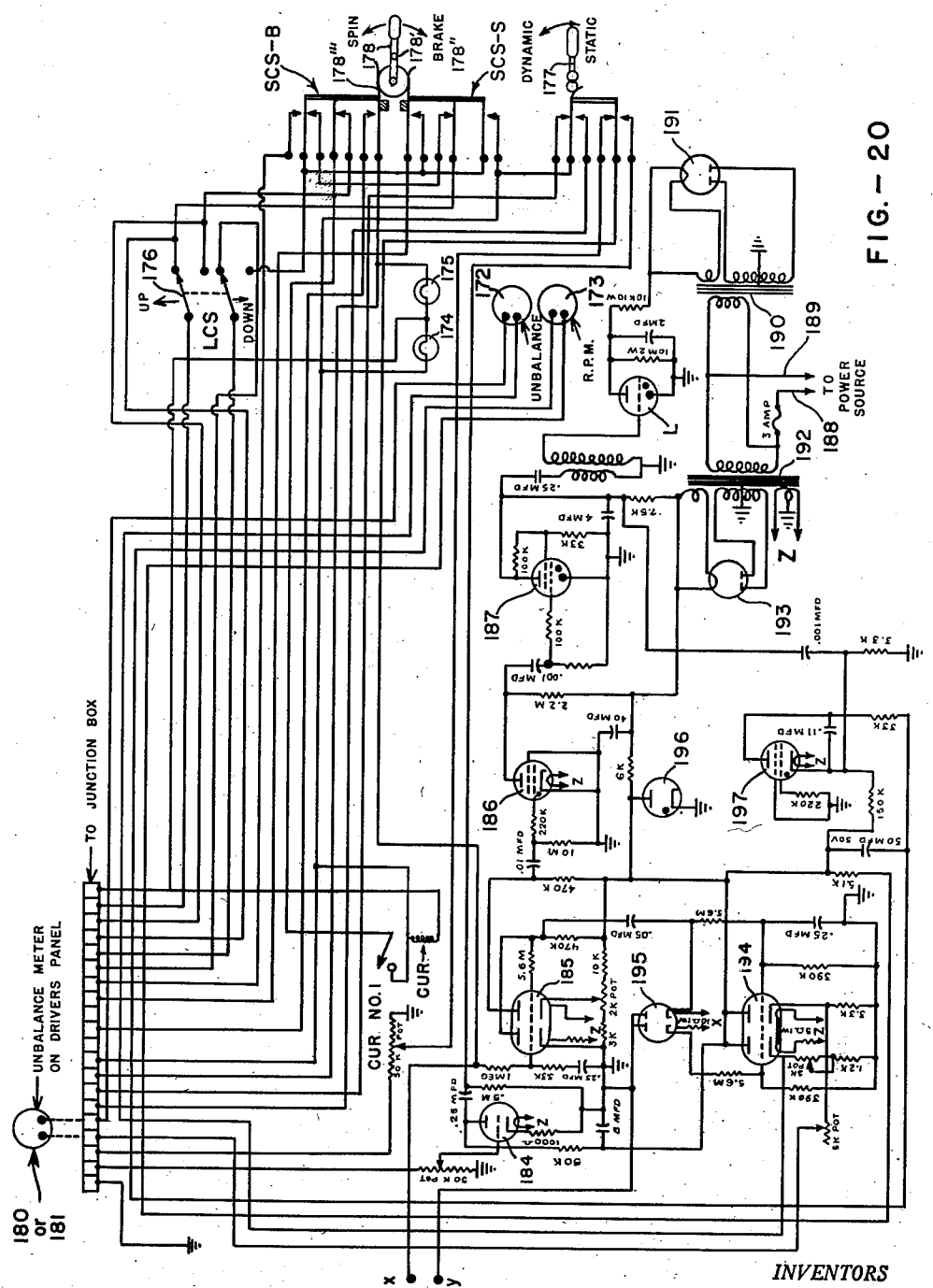

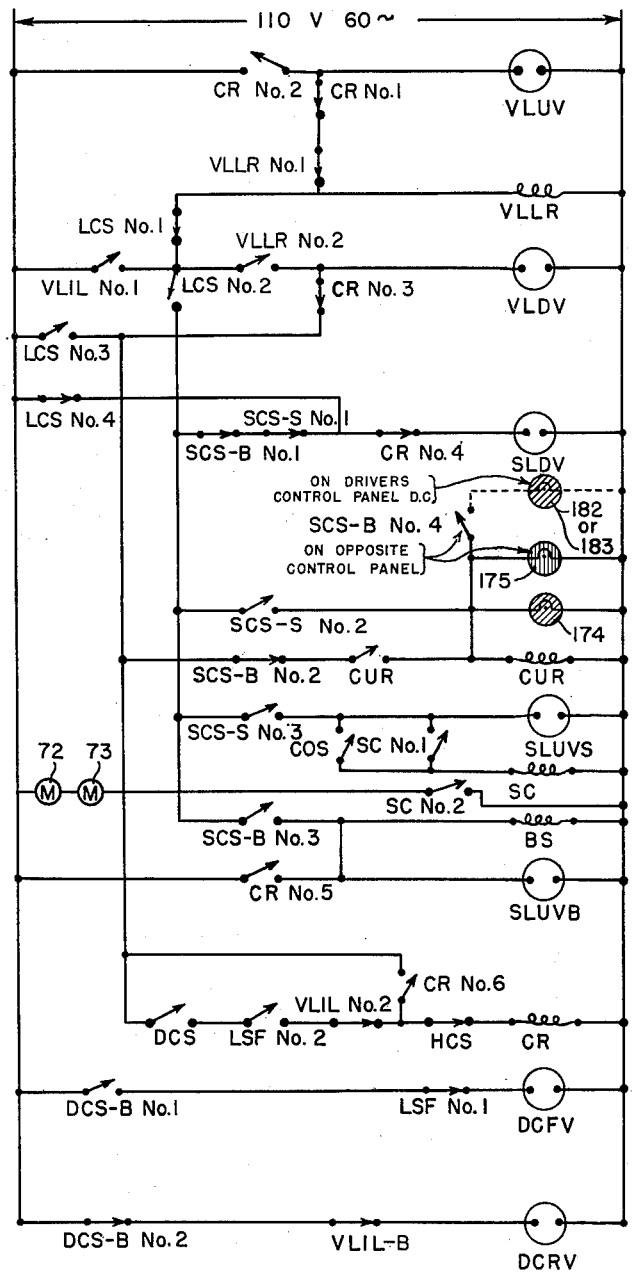
FIG.— 21

United States Patent Office 2,798,379
Patented July 9, 1957

2,798,379

APPARATUS FOR DETERMINING THE UNBALANCE OF A BODY IN SITU

Marcellus S. Merrill and Lowell H. Erickson, Denver, Colo.; said Erickson assignor to said Merrill Application May 7, 1951, Serial No. 224,859

11 Claims. (Cl. 73—457)

This invention relates to apparatus for measuring vibrations of rotating bodies for the purpose of determining both the static and dynamic unbalance thereof in order that corrective steps can be taken. The invention is particularly concerned with the determining of the unbalance of vehicle wheels while remaining in mounted position on the vehicle.

One of the objects of our invention is to produce an apparatus which will permit the determining of the unbalance of a plurality of wheels on a vehicle in a minimum of time.

A further object is to produce a balancing apparatus which will permit the determining of the unbalance of vehicle wheels by individual vibration pickups at opposite sides of the vehicle, and control means for determining the nature of the unbalance from the vibration picked up while the wheels are simultaneously supported in a manner that parts will be responsive to forces and each caused to rotate independently at will.

Another object is to provide improved means in a balancing apparatus for raising a vehicle off a support so that opposite wheels can be suspended, together with selective vibration pickup means and spinners for the wheels so that determination of the unbalance of the wheels can be accomplished in an extremely short period of time.

Yet another object is to produce a balancing apparatus for vehicle wheels which can be employed in conjunction with a factory assembly line to accomplish the balancing of the wheels while on the vehicle and in such a minimum of time that the rate of movement of the vehicles on the line as set for various assembly operations will not be interfered with.

A further object is to produce a balancing apparatus for a rotating member which will permit a structure on which the member is rotatable to be mounted on spaced resilient supports and spaced vibration pickups employed with stroboscopic lamp means operable in synchronism with vibrations caused by unbalancing forces when the member is rotating and detected by either pickup so that the nature of the unbalance can be determined and correction made therefor.

A still further object is to provide improved means for balancing companion wheels on opposite sides of a vehicle in which the vehicle will be supported on resilient supports so that the wheels are free to be rotated and spaced vibration pickups will be employed, together with means selectively responsive to the vibrations transmitted to either pickup by unbalancing forces when a wheel is rotated so that the nature of the unbalance of said wheel can be determined and corrective measures taken.

Still another object is to provide a wheel balancing apparatus for a vehicle which will permit the vehicle to be driven to a predetermined position where operator operated control means will be available to hoist the chassis so as to free wheels on opposite sides of the vehicle, to condition apparatus to pickup vibrations caused by the rotation of a wheel, to independently spin and brake each wheel, and to determine the nature of the unbalance of each wheel.

Yet a further object is to produce in a balancing apparatus, operator controlled means which will permit a vehicle chassis to be raised to free wheels on opposite sides thereof and then to spin and brake wheels at will and independently so that the unbalance of the wheels can be determined.

A further object is to produce in a balancing apparatus, carriage units for opposite sides of a vehicle with each unit being provided with vehicle lifting means, a wheel spinner and a vibration pickup, all under the control of an operator operated means including control means for causing the carriages to shift laterally of the longitudinal axis of the vehicle, and other control means for causing the pickups to engage a part of the vehicle adjacent a wheel.

A further object is to produce a balancing apparatus for determining the unbalance of wheels while remaining on a vehicle with which balancing stations are provided in laterally spaced relation with each station provided with operator operated control means and apparatus whereby, when a vehicle is moved between the stations, the vehicle can be lifted to free opposite wheels, the wheels rotated and vibrations picked up during rotation so that the nature of the unbalance can be determined.

A still further object is to provide improved operator operated means for determining the nature of unbalance of a vehicle wheel while it remains on a vehicle including operator controlled vehicle lifting means, wheel spinning means and vibration pickup means.

Other objects of our invention will become apparent from the following description taken in connection with the accompanying drawings showing details of a wheel balancer, by way of example, embodying the invention.

In the drawings:

Figure 1 is a top view showing a suitable rack structure upon which a vehicle is driven and with which is associated the mechanism (not shown) for determining the unbalance of the wheels of the vehicle while on the rack;

Figure 2 is a side view of the rack structure;

Figure 3 is a front view of the rack assembly with a vehicle thereon in lifted position for wheel balancing purposes, said view also showing the lifting structure, the wheel spinning structure and other structure embodied in the carriage for each wheel, together with the operator's control unit and stroboscopic lamp associated with each wheel;

Figure 4 is an enlarged view of the left hand carriage structure as viewed in Figure 3 showing additional details;

Figure 5 is a sectional view taken approximately on line 5—5 of Figure 4 showing structure which is not fully disclosed in Figure 4;

Figure 6 is a top view of the operator's control unit and stroboscope lamp showing the meters and control panel;

Figure 7 is a longitudinal cross sectional view through the top of the wheel lift assembly showing the mounting therein of the vibration pickup, Figure 8 is a sectional view taken on the line 8—8 of Figure 7 showing the permanent magnets and electrical coil of the pickup;

Figure 9 is a bottom view of parts of the carriages showing the centering cylinders and related parts, said view being taken on the line 9—9 of Figure 3;

Figure 10 is a view of the switch box and controls embodied in each carriage, said view being taken approximately on the line 10—10 of Figure 5 with the box cover removed;

Figure 11 is another view of the switch box and controls as viewed on the line 11—11 of Figure 10;

Figure 12 is a view partly in section of the junction box assembly, said view being taken on approximately the line 12—12 of Figure 4;

Figure 13 is a sectional view through the junction box as viewed on line 13—13 of Figure 12, said view also showing the movable mounting of a tubular support;

Figure 14 is a longitudinal sectional view of the power lift cylinder for the spinning motor and the brake for said motor;

Figure 15 is a sectional view of the brake control solenoid, said view being taken approximately on the line 15—15 of Figure 5;

Figure 16 is a sectional view taken on the line 16—16 of Figure 15, showing the pressure operated switch associated with the brake control solenoid;

Figure 17 is a view of the solenoid operated valves associated with each carriage assembly, said view being taken on the line 17—17 of Figure 5;

Figure 18 is a front view of the vehicle driver's unit panel showing the meters and signal lights, said unit being mounted on a post in full view of the driver, as seen in Figure 3;

Figure 19 is a schematic wiring diagram for the pickups and electronic control units;

Figure 20 is a wiring diagram of the electronic control units, as indicated by blocks in Figure 19; and Figure 21 is a wiring diagram showing circuits for the lifts, spinner motors, brakes, latches and other functioning parts of the carriages.

Our balancing apparatus is intended to be used either as a station on an automobile assembly line for balancing the wheels of the automobile as it passes along the assembly line with the wheels mounted thereon, or as a unit in the assembly line capable of traveling therewith, or for use as a two wheel unit setup in service stations or other places where there are a number of wheels to be balanced and such should be done in a minimum of time. In order to accomplish this desired rapid balancing of wheels, a suitable rack structure can be used with the balancing apparatus above the ground level or floor, or a balancing station can be provided in which the balancing apparatus is submerged below the ground level in a suitable pit structure if a rack structure in the assembly line is not convenient. Other arrangements are also believed to be apparent, such as a station movable with an assembly line during balancing and then returned for a new travel. However, by way of example, we have illustrated a rack assembly as a structure upon which the vehicle can be driven or otherwise moved to perform the balancing operations on the wheels of the vehicle without removing said wheels from the vehicle. Such a suitable rack structure is shown in Figures 1 and 2 without the balancing apparatus being disclosed, as the manner in which it will be associated is believed to be apparent from other figures such as, for example, Figure 3.

In Figures 1 and 2 the rack structure disclosed includes horizontal runways 25 and 26 supported above the ground floor by pairs of post structures 27 and 28 and other intermediate pairs of supporting structures 29 and 30. Extending across between the posts 27 and 28 are parallel tubular supports 31 and 32 and similar parallel tubular girders 33 and 34 extend across between the posts 28. It is upon these girders that the runways 25 and 26 will be positioned. Leading up to the horizontal runways will be a ramp formed by spaced inclined runways 35 and 36, these latter runways resting upon the support 34 and being aligned with the horizontal runways 25 and 26. There will also be provided a ramp comprising inclined runways 37 and 38 which will permit the automobile to be run off the rack structure, these inclined runways being supported on the tubular support 31. The rack structure can be adjustable so as to receive vehicles having different length wheel bases. To get a vehicle on the rack, it can be driven up the inclined runways 35 and 36 and then assume a position where the front wheels will be in resting position between and on the cross tubular supports 31 and 32 supported by the front posts and the rear wheels will be in resting position between and on the tubular supports 33 and 34 extending across between the rear posts 28.

Assuming that the rack structure is constructed primarily for four wheel vehicles such as passenger cars and light delivery trucks, there will be associated with the tubular cross supports 31 and 32 balancing apparatus for the two front wheels. For the two rear wheels, which will be associated with the tubular girders 33 and 34, there will be similar balancing structure for the said wheels. The balancing apparatus which will be employed is generally shown in Figure 3 which is a front view of the rack structure with an automobile driven upon the rack and the balancing apparatus employed to lift the front of the vehicle and ready it for the actual operations to determine the unbalance of the front wheels. It is believed that all that is necessary to understand the balancing apparatus embodying the invention is to describe the structure which is employed to perform the operations to determine the unbalance of the front wheels. From this description it will be obvious how the unbalance is determined with respect to the rear wheels.

Referring in detail to Figure 3, there is provided for performing balancing operations on the front wheels, carriage structures which will be referred to as dollies and carried by each of these dollies will be a vehicle lifting structure, a combined wheel spinner and brake structure and an operator's control unit. The dolly for the right front wheel of the vehicle is indicated in Figure 3 by the reference character D and that for the left front wheel as $D^1$. The lift associated with the dolly D is indicated generally by the character VL and the spinner and brake assembly is indicated by the letter S. The control unit for the dolly D is indicated by the letters CU. In a similar manner the vehicle lift and the spinner of the dolly $D^1$ are indicated by the letters $VL^1$ and $S^1$, whereas the control unit for this structure is indicated by the letters $CU^1$. Since all the structure embodied in each dolly shown in Figure 3 is identical, as is also the control units, only one will be described in detail and like reference numerals used in connection with one dolly and control unit will also identify like structure in the other dolly and control unit. It is to be noted that although the dollies and embodied apparatus are identical, they are positioned reversely on track structure to be referred to.

Each dolly is mounted beneath the tubular cross supports 31 and 32 at the front end of the rack. Each dolly housing and frame structure 39 is provided with wheels 40 which support the dolly on the parallel track structures T extending crosswise between the two posts 27. With this construction it will be possible to move the dollies crosswise of the vehicle so the vehicle lifts of each dolly can be positioned, as desired, beneath the vehicle to thereby raise the vehicle and support it so that the front wheels will be free for rotation. In order to move each dolly, the frame structure carries a cylinder 41 and within this cylinder is a piston 42 on the end of a piston rod 43 which extends out of the cylinder and is arranged to be connected by a lug 44 on a track structure T, all as best shown in Figure 9. The piston 42 is acted on by a coil spring 45 which surrounds the piston rod within the cylinder. The end of the cylinder opposite that from which the piston rod extends is connected by a conduit 46 with a source of fluid pressure which, in the particular structure, is air under pressure.

There will also be provided for each cylinder two control valves, which will be solenoid operated, one valve being employed to admit air under pressure to the cylinder and the other valve being employed to exhaust the air from the cylinder, all of which will become apparent from the solenoid valve assembly later to be described and shown in detail in Figure 17. Since the piston rod 43 is fixed, it will be seen that if air under pressure is admitted into the cylinder 41, the cylinder will be caused to move to the right, as shown in Figure 9, and since the cylinder is fixed to the dolly housing it will move the whole dolly to the right. Since Figure 9 is a view of the structure of dolly D¹, then this dolly D¹ will be moved on the track structure to the right. When it is desired to move the dolly D¹ to the left, air can be exhausted from the cylinder 41 and then the spring 45 will expand and result in the cylinder and dolly D¹ being moved to the left. In a similar manner the dolly D will be moved by its cylinder and piston arrangement since the piston rod 43 is connected to the track structure in a manner already described and also shown in Figure 9. Air admitted to the cylinder of the dolly D will move this dolly to the left, as viewed in Figure 3, and exhausting the air from said cylinder will result in the dolly D being moved by the spring to the right.

The air to the cylinder 41 of the dolly D¹ and the air to the cylinder 41 of the dolly D will be controlled by valves operable by the vehicle as it comes on the rack, as will be later described. With these controls it will be possible to position the dollies so that the vehicle lifts thereof are at the desired positions so that when these lifts are operated, the desired parts of the front end of the vehicle will be engaged by the lifts and the vehicle hoisted so that the wheels will be suspended free.

The vehicle lift for each dolly, as shown, is also operated by air pressure. As can be seen in Figures 3 and 4, each air lift has a cylinder 47 in which is positioned a piston 48 provided with a piston rod or ram 49 and on the top of this ram is a housing structure generally indicated by the number 50, through which the ram can engage a part of the vehicle and hoist it off the rack structure upon which it has been driven. The lower end of the cylinder 47 will be connected through a conduit to the source of air pressure and associated with this conduit will be solenoid operated control valves, to be later described, whereby air can be admitted to the cylinder to raise the piston and ram, or exhaust the air from the cylinder to allow the ram to be retracted. The solenoid operated valve for controlling the air lift will be arranged to be under the control of the operator at the control units and to accomplish this there will be switches to control the solenoid operated valves, all to be later described.

The just mentioned housing 50 on the top of each ram 49 of the vehicle lifting means is constructed to have embodied therein the vibration pickup means for detecting the unbalancing forces which will be transmitted to parts of the vehicle engaged by the housings 50 when a wheel is rotated in freely suspended position. The housing 50 and the pickup structure embodied therein is clearly shown in Figures 7 and 8. On top of the ram 49 there will be carried a plate 51. On this plate and carried thereby is an unstanding hollow structure 52 to which the housing 50 will be connected by heavy leaf springs 53 and 54, the bottom leaf spring 53 connecting the hollow structure 52 to the lower end of the housing 50 and the spring 54 connecting the upper end of the hollow structure 52 to the housing structure 50. The load of the vehicle will not be supported by these springs as this will be done by a plurality of rubber pads 55 which are interposed between the top plate 56 of the hollow structure 52 above the upper spring 54 and the top plate 57 of the housing 50. In Figure 7 these rubber pads are shown in their compressed condition when the weight of the vehicle is hoisted and its load is imposed on the top plate of the housing 50. With this structure just described, it will be seen that the vehicle will be resiliently supported whenever the vehicle is raised by the lift and under these conditions vibrations which are being transmitted to the vehicle by any rotating wheel are transmitted through the rubber pads and the two leaf springs to the housing 50 and this housing will be caused to vibrate relative to the hollow structure 52 which is mounted on the top of the ram of the lift.

The pickup which is to detect the vibrations is enclosed within the housing 50 and attached thereto, this pickup being generally indicated by the latter P and shown in detail in Figures 7 and 8. Attached to the inside of the housing 50 is a second housing 58 provided with a cover 59 at one side thereof. Bolts 60 connected the housing 58 to the housing 50. Within the housing 58 is a "seismic" mass 61 which is attached by flexure leaf springs 62 and 63 to the cover 59. This mass may be of any suitable non-magnetic material such as brass. Since the housing 50 is directly engaged with part of the vehicle when the vehicle is lifted off the rack and the housing 58 is rigidly connected to the housing 50, it will be seen that any vibrations transmitted to the housing 50 will also be transmitted to the housing 58 and these vibrations will cause, through the flexure of leaf springs 62 and 63, a vibration relative to the mass 61.

This mass 61 is arranged to carry the permanent magnets of the pickup, which permanent magnets are two in number and shaped in a U. These magnets are indicated by the numerals 64 and 65 and are arranged so their ends are in spaced relation in order to provide a magnetic path. The north pole of one magnet will be opposite a south pole of the other magnet and vice versa. Between the ends of the permanent magnets there is positioned a core 66 of laminated magnetic material, and surrounding this core is a coil 67 for the pickup. The coil and its core are rigidly connected to the cover 59 of the housing 58 by arms 68. The ends of the pickup coil will be connected to conductors 69 and 70 which lead from the housing 50 to a cable 71 and from there to the proper control units.

Since both the permanent magnets 64 and 65 are mounted on the "seismic" mass and therefore remain stationary in space, the pickup coil will move relative to the permanent magnets and it will be seen that movement of the coil will change the reluctance of the magnetic paths and as a result there will be changes in the magnetic flux of the core of the pickup coil and such changes will be proportional to the vibrations causing the movement of the housing 50. The change in the magnetic flux of the core of the pickup coil will cause a voltage to be established and this voltage will be proportional to the amplitude and frequency of the vibrations. The voltage induced into the pickup coil will be an alternating voltage, due to the fact that the permanent magnets 64 and 65 are stationary with the mass and the ends of one permanent magnet will first be closer to the core of the coil than the ends of the other magnet and then farther away as the vibrations take place. The induced voltage is very small and it will be amplified in a manner which will become apparent. Also, in the particular hookup used the voltage will be integrated to make it proportional to the displacement caused by the vibrations received.

The spinner S, which is carried by each dolly, comprises two motors 72 and 73 which are arranged in axial alignment on opposite sides of a double spinning wheel 74. The motors have suitable housings and these housings are arranged to extend around the spinning wheel on all sides thereof, except the top, in order to expose the wheel for engaging the surface of a tire, as is well illustrated in Figure 3. The housing of the motors of the spinner are mounted on two hinge arms 75 and 76, as can be seen in Figure 5 and Figure 14. These mounting arms are pivotally connected to a head member 77 which is fixed to the top of a hollow piston rod 78 (see Figure 14).

This piston rod extends to the lift cylinder 79 which is fixed to cross support members 80 and 81 carried by the dolly frame structure. The piston rod at its lower end is provided with a piston 82 and this piston will abut the lower closure end wall 83 of the cylinder when the spinner is in its down position. To prevent the piston from rotation in the cylinder and maintain the spinner wheel in proper position for engaging the tire, the head member 77 on the upper end of the piston has a downwardly extending rod 84 which slides through an oversized hole 85 on the attaching head 86 for the cylinder 79. A conduit 87 is connected to the cylinder closure member to conduct air to and from the cylinder and thus cause the movement of the piston therein and the lifting of the spinner so that the spinning wheel driven by the motors can engage the tire. The air will be controlled by solenoid operated valves, as will become later apparent. The control, as will be later apparent, is such that the spinner will be moved upwardly to engage the tire when the vehicle is lifted. The movement of the spinner upwardly will also control the height the vehicle wheel is raised by the vehicle lift, as will also become apparent. After the vehicle is lifted, the spinner will be retracted to its down position. Thereafter, when spinning is desired, a control element can be operated and as a result the spinner will be lifted to engage its wheel with the tire and spinning will be accomplished. After spinning, the spinner will be again lowered to down position.

It is also desired to brake the vehicle wheel after the vibrations are detected with the vehicle wheel spinning at the desired speed. The braking of the wheel is necessary because, as soon as the information is obtained, the wheel should be stopped to make the desired placement of weights on the wheel to correct the detected unbalance. As shown in Figure 14, the head member 77 has pivotally mounted thereon a brake shoe 88 which will be directly below the spinning wheel and between the two mounting arms 75 and 76 on which the spinning motors are mounted. This brake shoe 88 is arranged to be operated by the spinning wheel lift plunger.

The spinner mounting arms 75 and 76 have a very definite relationship with the operation of the brake. The free ends of these arms are connected together and arranged to rest on the top of a plunger 89 which is carried by a brake control solenoid housing 90 positioned below the free ends of the spinner arms and attached to the head to which the spinner mounting arms are pivoted. The brake solenoid housing is shown in detail in Figures 15 and 16 and it is positioned on the dolly, as best shown in Figure 5. Referring now to Figures 15 and 16, it will be noted that the plunger 89 is reciprocal in the cover 91 of the housing 90 and is maintained in an upward position by a coil spring 92 positioned between a shoulder 93 on the plunger and a flange 94 carried by the housing cover. The plunger is limited in its upward movement under the action of spring 92 by a disc 95 carried on the lower end of the plunger inside the housing 90. A snap ring 96 is attached to the inner end of the plunger and thus the disc will limit the upward movement of the plunger. The disc 95, however, is free on the plunger and the plunger can move relative to the disc if it is pushed downwardly and the spring compressed. A suitable boot 97 surrounds the outer edge of the plunger to keep dirt and foreign material from interfering with the free movement of the plunger.

With the construction just described, it will be seen that the spring 92 acting upwardly on the plunger will push upwardly on the spinner support arms and maintain the spinning wheel 74 slightly above the brake shoe. The inward movement of the plunger 89 is arranged to be controlled by a solenoid which, for the purpose of convenience, will be indicated by the letters BS to indicate "brake solenoid." This solenoid is attached to the cover 91 and the plunger 98 of the solenoid will be attached to a slidable control element 99 having an opening 100 therein. The control element 99 rests on a cross partition 101 extending up from the bottom of the housing 90. A spring 102 is connected to the control element 99 and a plug extending downwardly from the housing cover. This spring normally holds the control element in a position where the hole 100 will be out of alignment with the end of the plunger and therefore the plunger cannot move downwardly. It, however, is permitted some slight downward movement which is sufficient to allow for a slight movement of the disc 95.

If the brake solenoid BS should be energized it will pull the control element 99 to the position shown in Figure 15, and when in this position the hole 100 will be aligned below the end of the plunger and the plunger can be forced downwardly by compressing the spring 92. This downward movement of the plunger is sufficient to permit the brake shoe 88 to be moved upwardly and engage the spinning wheel and thus brake said wheel. Since the wheel will be engaged with the tire, the braking of the spinning wheel will also brake the vehicle wheel.

As already mentioned, Figure 15 shows the condition of the control member 99 when the brake solenoid BS is energized. If the brake solenoid is not energized, then the control element 99 will move over to the left, as viewed in the figure, having been pulled there by the spring 102. If the spinner lift is now operated to spin the wheel, the spinner motors and spinning wheel will be lifted by the piston and the spinning wheel brought into engagement with the tire. Continued air pressure operating on the piston 82 of the lift at a predetermined value will firmly hold the spinning wheel in engagement with the tire and when so held the brake will be in spaced position with respect to the spinning wheel, because plunger 89 rests on control element 99 which in turn rests on cross partition 101. Therefore, the spinner mounting arms 75 and 76 cannot move downward sufficiently, regardless of the pressure applied by the lift, for the brake shoe to contact the spinning wheels.

After spinning is accomplished, braking can be brought about merely by energizing the solenoid BS. When this is done the control element 99 will move to the position shown in Figure 15 and thus, by application of additional air under pressure to the lift cylinder, the brake shoe will be brought into engagement with the spinning wheel since now the spinner mounting arms can move farther downward, such being permitted by the movement of the plunger 89 into the hole 100 of the control element 99 and a compressing of spring 92.

The slight movement of the plunger 89 downwardly to engage the top of the control element when the brake solenoid is not energized is employed to close a switch which will close the circuit for the two spinning motors 72 and 73. This switch is shown in Figure 16 and since it is a contact operated switch, it is indicated by the letters COS which will be a part of the nomenclature used in explaining the circuits forming a part of the balancing apparatus. This contact operated switch is positioned within the housing 90 alongside of the part of the cover through which the plunger 89 extends. The position is such that the disc 95 of the plunger can engage the control element 103 of the switch when the plunger is held upwardly to its fullest extent by the action of the spring 92. The switch will automatically close whenever the plunger 89 is moved downwardly slightly, such slight movement being permitted before the end of the plunger can engage the control element 99. The slight movement, however, will not be sufficient to cause any braking. The disc 95 will not interfere with the downward movement of the plunger into the hole because there is nothing to prevent the disc from sliding upward on the plunger above the snap ring 96. The manner in which the contact switch COS is in the control circuit for the motors will be later described. With this contact switch controlling the operation of the motors, it will be seen that as soon as the spinning wheel is brought into engagement with the tires the motors can be started so that spinning can be accomplished.

It has been found not desirable to hold the vehicle by the vehicle lift cylinder in lifted condition under air pressure. After the vehicle is lifted by the ram 49 of the air lift, it will be locked in lifted position by a ratchet mechanism and thereafter the air in the vehicle lift cylinder can be released. The ram of the vehicle lift VL is provided with a plurality of teeth 104 along its length and cooperating with these teeth will be a slidable latch 105, this latch being shown in Figure 10 as projecting into the switch box 106. It will be noted from Figure 5 that this switch box is on the front side of the dolly D and on the other dolly D¹ it will be on the rear side. The switch box is attached to a part of the head 107 of the air lift cylinder 47. The head also has slidable therein the latch which extends into the switch box. The inner end of the latch will then cooperate with the ram of the lift and when allowed to move inwardly can engage any one of the teeth on the ram to hold the ram in a lifted position.

Referring again to Figure 10, it will be seen that the latch is controlled by a bell crank lever 108 pivotally mounted in the switch box on a pin 109. One arm of this bell crank lever is pivoted to the latch by a "sloppy" pin connection 110 and the other arm of the bell crank lever is arranged to be actuated by a solenoid indicated by the nomenclature VLLR (solenoid). The connection between the plunger of the solenoid and the arm 108 is by means of a relatively strong spring 111. When the solenoid is de-energized, the latch will be yieldably forced inwardly toward the ram by means of a spring 112, this spring being connected to the arm 108 and anchored on the switch box as shown. The spring 112 will be weaker than the spring 111 so that when the solenoid is energized the bell crank lever can be operated to release the latch and also stretch the spring 112. By using the spring 111 between VLLR (solenoid) and the bell crank arm 108 for pulling out the latch, it will be seen that it will permit the solenoid to be energized, even though the weight of the vehicle is still on the ram of the vehicle lift preventing release of the latch. As soon as this weight is relieved by allowing air to enter the lift cylinder, then with the solenoid already energized the spring 111 can be effective to release the latch.

The switch box also has mounted therein a switch for controlling the circuit of the VLLR (solenoid) and the exhaust valve for the main air lift. This switch, which is of the double type, is mounted at the inner end of the latch 105, as indicated by the nomenclature VLLR (switch). This switch has a button which will be engaged by the end of the latch when the latch is pulled to released position. Since the VLLR (switch) cannot be controlled until the latch is released, then it will be impossible to control the solenoid controlled exhaust valve for the main lift until the latch is released, thus there will be assurance that the main lift can have air pressure applied thereto to raise the vehicle slightly and permit the latch to be released before the vehicle is let back down on the rack.

The switch box 106 also has mounted therein two interlock switches VLIL and VLILB and a height control switch HCS, all of which are of the double type, except VLILB, and embodied in the electrical circuits to be later described. The vehicle lift interlock switches will operate positively when the vehicle lift is raised and the height control switch will be operated positively in a manner to control the tire height when the vehicle is raised by the vehicle lift. Below the interlock switches and slightly to one side thereof there is mounted in the wall of the switch box a shaft 113 and secured to the inner end thereof is an arm 114 extending upwardly to control both interlock switches. The arm is biased by a spring 115 so that one set of the two interlock switches will be normally held open, whereas the other sets will be held closed. The opposite will be true when the arm 114 is withdrawn from the switches against the bias of spring 115. The outer end of this operating shaft 113 carries an arm 116 whereby the switches can be operated thereby when the vehicle lift ram is in its lowermost position. To perform the operation of the interlock switches by arm 116, the ram 49 of the vehicle lift will have on its head a projecting finger 117 (Figure 4) for engaging the arm 116, pulling it downward and thereby moving arm 114 away from both interlock switches whenever the ram is in full down position.

Parallel with the shaft 113 mounted in the switch box will be another shaft 118 positioned below the height control switch HCS. The inner end of this shaft has attached thereto an arm 119 extending upwardly to control the switch. A spring 120 biases the arm to switch opening position. On the outer end of the shaft there is attached a height control arm 121. The outer end of this control arm 121 is connected by a chain 122 and a spring 123 to the spinner support head 77. With this arrangement it will be seen that when the spinner is raised by its lift and reaches a certain height so as to place the chain 122 under tension, as shown for example in Figure 3 (dolly D¹), the arm 121 will be operated and thus cause the height control switch to be closed, since the arm 119 will then be swung away from the operating control button of the switch.

Also mounted in the switch box 106 is a centering control switch LSF of the double type. It is by means of this switch that the movement of the dollies from their inner position to the proper outer position will be controlled so that the vehicle lifts will be under the desired part of the vehicle for engagement by the rams and the lifting of the vehicle off the rack upon which it has been driven. Spaced from the centering control switch and journaled in the wall of the switch box is a shaft 124. On the inner end of this shaft is pinned a lever 125 and this lever controls a spring actuating finger 126, by means of which the centering control switch will be controlled. The finger 126 is one end of a spring 127 which is coiled around the end of the shaft 124, with its other end 128 projecting for engagement with the bottom wall of the switch box. An element 129 is employed to connect the finger 126 with the lever 125. The outer end of the shaft 124 has a block 130 and secured to this block is a centering control arm 131. Between the block 130 and the boss forming a bearing for the shaft 124 there is provided a spring 132 which normally so acts on the shaft that it will cause the ends of the lever 125 carried by the inner end of the shaft to be frictionally pressed against two bosses 133 and 134 carried by the switch box wall on the opposite sides of the shaft 124.

As best seen in Figure 4, there will be provided, in addition to the centering control arm 131 which extends upwardly from the block on the outer end of the shaft 124, a dummy arm 135, said arm also being shown in Figure 5. It will be noted that this arm is bolted to a block 136 which is pivotally mounted in the top of a U-shaped bracket 137 suitably secured to a cross member of the dolly. The upper ends of the centering control arm 131 and the dummy arm 135 are connected by a rod 138. Adjustably mounted on this rod is an upstanding centering finger 139, the adjustment being made by split block 140 slidable on the rod 138 and capable of being clamped thereto by a bolt 141. With this adjustment of the finger on the rod, the finger can be placed anywhere along the rod.

The purpose of the finger is to engage the inner side of a tire and thus control the stopping of the movement of the dolly along its track as it is moved outwardly under the control of the centering air cylinder 41 already referred to. It will be noted from Figures 3 and 4 that if, for example, the dolly D is caused to move from its inner position toward the left by placing air under pressure in the cylinder 41, then as the dolly moves over to the left, as viewed in Figure 3, the finger 139 will ultimately engage the tire of the wheel resting on the two tubular supporting members 31 and 32. When this engagement takes place, the centering control arm will be moved to the right, as viewed in Figures 3 and 4, with the result that the lever 125 in the switch box secured to the shaft 124 will be given clockwise rotation, as viewed in Figure 11. The centering control switch will then be operated, thus controlling the proper valve, to be later referred to, and thereby cause stopping of the movement of the dolly. After the vehicle lift has been operated, the wheel will then be moved upwardly away from the finger and consequently the finger will still remain at the same position to maintain the switch properly controlled because of the friction present between the ends of the levers and the bosses 133 and 134, caused by the action of the spring 132. The switch will remain properly controlled as long as the dolly remains away from its center position.

It will be recalled that the dolly can be returned to the center position whenever air is exhausted from the air cylinder 41 which moves the dolly and, as this exhausting occurs, the return will be accomplished by the spring 45 in the cylinder between the piston and the end of the cylinder. As air is exhausted and the spring returns the dolly, the finger 139 which caused the opening of the center control switch LSF will be operated to return the switch to closed position and this operation is accomplished by a fixed arm 142 which is mounted on the front tubular cross support 31. Such fixed arm 142 is shown in Figures 4 and 5. This single fixed arm can be engaged by finger 139 on each dolly. To permit this the centering control arm 131, together with dummy arm 135, will be reversely mounted on dolly $D^1$ from the mounting on dolly D to thus place its fingers alongside tubular support 31 instead of rear tubular support 32. When a finger engages the fixed arm 142, the lever 125 in the switch box will be given a counterclockwise rotation, as viewed in Figure 11, and as a result thereof the centering control switch LSF will be allowed to become closed and the arm will be frictionally maintained by the friction engagement of the ends thereof with the bosses 133 and 134.

In the switch box there will also be a control relay CR which will be part of the circuit in which the height control switch HCS is positioned and this circuit will control the height to which the vehicle is raised, as will become later apparent. This control relay embodies six switches controlled by a single solenoid, all of which will be apparent from the functional wiring diagram of Figure 21. The switch box has a suitable cover 143 and is also provided with electrical connectors at its ends comprising four in number and indicated by the numbers 144, 145, 146 and 147. It is by means of these connectors that electrical conductors, to be later referred to in the wiring diagram, will be brought into the switch box for connecting up the various switches, the solenoid and the height control relay. Through one of the connectors, 147, the conductors 69 and 70 will also be brought into the switch box by way of the cable 71 from the pickup positioned in the housing 50 at the top of the main air lift structure already described.

Also associated with each dolly is a solenoid valve assembly generally indicated by the letters SVA and shown in Figure 5, such being at the opposite side of the spinner structure and its lift than that of the switch box. This solenoid valve assembly is shown more in detail in Figure 17 and comprises the various solenoid controlled valves by means of which each dolly is moved outwardly from its central position, returned to its central position, the vehicle lift operated to raise the vehicle and exhausted to lower the vehicle and further whereby the spinner lift is operated both in an up and down position, and still further the spinner lift has applied thereto a high pressure to bring about the braking action after spinning has taken place. The solenoid controlled valves, as shown in Figure 17, are each given a special nomenclature which will be employed in the functional diagram of Figure 21 in order to better understand the operation of the balancing apparatus. The solenoid controlled valve for allowing air to enter the cylinder of the vehicle lift cylinder is indicated by the letters VLUV and the solenoid controlled valve for exhausting the vehicle lift cylinder is indicated by the letters VLDV. The solenoid controlled valve for admitting air under pressure to the dolly cylinder 41 is indicated at DCFV and that solenoid controlled valve which is employed to exhaust the air from the dolly cylinder is indicated by the letters DCRV.

For controlling the spinner lift there are three solenoid valves whereby low air pressure is employed to lift the spinner and apply a force to the spinning wheel 74. SLDV is the solenoid controlled valve for exhausting the spinner lift to allow the spinner to return to normal "down" position and SLUVB is the solenoid controlled valve for applying high pressure to the spinner lift whereby the brake shoe will be pressed onto the spinner wheel to brake such wheel and also the vehicle wheel. The electrical terminals of the valve assembly are suitably protected by a cover 148. Air under pressure is supplied to all the control valves through a conduit 149.

The two dolly control valves whereby air is admitted to the cylinder 41 to move a dolly outwardly and exhaust air from said cylinder to allow the dolly to be moved inwardly on its track under the action of the spring 45 will have associated therewith suitable throttle valves which are indicated by the numbers 150 and 151 (see Figure 17). The conduits leading from the various valves of the solenoid valve assembly to the various cylinders are not shown in the drawings as it is believed such would only confuse the illustrations, it being understood, however, that there will be suitable conduits from the two vehicle lift control valves to the vehicle lift cylinder and from the two dolly control valves to the dolly moving cylinder 41 and from the three spinner lift control valves to the spinner lift cylinder 79.

On the outer end of each dolly there will be provided a spinner controller SC (see Figures 3 and 4) for starting the spinning motors 72 and 73. This is a standard motor starter of the heavy duty contactor type and involves a magnetic controller. Since the motor starter is of well known construction, it is not believed necessary to describe it in detail. The power for the starter is supplied from a source of power through the cable 152.

At each post 27 of the rack whereby the cross tubular supports 31 and 32 are mounted, there will be provided a junction box 153. This junction box and the switch box 106, already referred to and described, there is a connecting cable 154 for containing the various conductors for making the electrical connections between the junction box and the switch box. Another cable 155 containing various conductors will connect the junction box with the control unit.

Referring now to Figure 12 showing the junction box, on the top wall thereof is mounted a plunger 156 which is biased upwardly by a spring 157 interposed between a shoulder on the plunger and the bottom of a bore in which the plunger is mounted. The upward movement of the plunger is limited by a disc 158 mounted on the inner end of the plunger and arranged to be picked up by a snap ring 159. The plunger is free to move through the disc 158 whenever the plunger is moved downwardly from its normal position shown in Figure 12. This disc 158 is employed to control two switches DCS and DCSB shown in Figure 13. DCS is a single switch and DCSB is of the double type having two sets of contacts, one of which will be open and the other closed when the plunger is moved upwardly to its fullest extent and carries with it the disc 158. The condition of the switches is reversed when the plunger is caused to move downwardly and permit the discs to be moved away from the switches by the spring action on the control buttons thereof.

The purpose of the switches DCS and DCSB is to control the dolly by the weight of the vehicle. To accomplish this the cross tubular supports 31 and 32 have a special mounting on the posts 27. The ends of these tubular supports are rigidly connected by a plate 160 with the plate opposite the end of the tubular member 31 pivoted to the post. The plate at the end of the other tubular member 32 will have a yieldable connection with the post, which will be limited as noted from Figure 12. This end of the plate 160 has a pin 161 which extends through a slot 162 in the post 27. Underneath the tubular member 32 there will be positioned a spring 163 which is arranged to act on a plunger 164, the upper end of which will abut the bottom of the tubular member. The plunger and spring are mounted in a casing 165 which is rigidly secured to the post 27. The plunger and spring act to normally bias the tubular support member 31 up to its fullest extent permitted by the slot 162 in which the pin 161 is mounted.

With this construction it will be seen that when a vehicle is driven onto the rack and the wheel of the vehicle rests on both the cross tubular members 31 and 32, the weight of the vehicle will press the end of the tubular member 31 downwardly against the action of the spring 163 and to the limit permitted by the slot 162 through which the pin 161 extends. It is by means of the downward movement under the weight of the vehicle that the previously referred to plunger 156 will be pressed downwardly to control the two switches DCS and DCSB.

Referring to Figure 12, there is mounted on the connecting plate 160 between the two tubular support members an actuator 166, the mounting being accomplished by a pin 167 which will permit a rotation of the actuator. One end of the actuator rests on the top of the plunger 156 and the other end of the plunger extends upwardly alongside the plate 160. When no weight is on the vehicle the actuator will be so biased that the end will rest on the plunger, but the plunger will nevertheless be maintained in its upward position by the action of the spring 157. This is accomplished by the use of a wire spring 168 which is coiled around the pivot pin of the actuator 166 and has one end connected to the actuator and the other end hooked over a stop pin 169 carried by plate 160. This spring will thus normally pull the upper arm of the actuator against the pin. The spring is strong enough to hold the actuator against the stop pin 169 as the plate 160 is moved downwardly under the weight of the vehicle. Consequently the plunger 156 will be moved downwardly and both switches DCS and DCSB actuated as a result of the disc 158 being free to be moved away from the buttons of the switches. If, at any time with the vehicle wheel on the tubular supports, it should be desired to manually control the switches DCS and DCSB and cause them to be conditioned in their normal position assumed when no vehicle is on the rack, then the upper end of the actuator can be pressed downwardly with the result that the lower end of the actuator will be moved away from the plunger 156 and the plunger spring can then return the plunger to its normal upper position, as shown in Figure 12. The electrical connections for the two switches DCS and DCSB, and the manner in which they are capable of controlling the dolly, will become apparent when the functional wiring diagram (Figure 21) of the apparatus is described.

As has already been mentioned, there is a control unit (CU and CU') for each dolly and the various operating units carried thereby, including the lifts, spinners, pickups, etc. These control units are mounted alongside the posts 27 of the rack so as to be adjacent the vehicle wheel. Each control unit, as shown in Figure 6, has a base 170 and an instrument box 171 mounted on about three-fourths of the base. On the other part of the base adjacent the wheel will be a stroboscopic lamp L. The various electronic tubes and manually controlled switches for the operator, together with certain indicating lights, will be placed in this instrument box 171. There will also be carried by this box the two meters for indicating to the operator the speed of rotation of the wheels and the unbalance of the wheels which is obtained by the unbalancing forces detected by the pickups in the heads of the vehicle lift rams carried by the dollies and already described.

As best shown in Figure 6, the unbalance meter is indicated by 172 and the speed of rotation (R. P. M.) meter by the number 173. These meters are exposed on the top panel of the box. Below the meters on the control panel will be a green light 174 and a red light 175. There will also be a vehicle lift control lever 176 for controlling a vehicle lift control switch in the box, to be referred to in the functional diagram by LCS. The lever will have two operative positions only. When the switch lever is moved toward the indicia "Up" on the panel, then the vehicle lift will be operated through the proper control of the solenoid operated valves which are part of the valve assembly shown in Figure 17. When the switch lever is placed at its normal "Down" position, then this will so control the circuits and the solenoid operated valves for the vehicle lift that the vehicle will be lowered back onto the rack.

Also on the control panel is a pickup selector lever 177 for controlling switches in the box (to be later referred to in the control unit wiring diagram of Figure 20) so that the static and dynamic unbalance of the rotating wheel can be determined on the unbalance meter 172. When the selector arm is thrown to the indicated static position, then the pickup will be connected to the unbalance meter, this pick-up being the one on the vehicle lift, the dolly of which is controlled by the control unit on which the pickup selector arm is mounted. For example, if the operator at the control unit CU throws his pickup selector lever to "Static," then the unbalance meter will be showing the unbalancing vibrations picked up by the pickup in the vehicle lift VL. When the pickup selector lever is moved to the dynamic position, then the pickup in the other vehicle lift VL' will be connected into the unbalance meter and this meter will then show the vibrations detected by such pickup. It is by this latter pickup that the dynamic unbalance of the wheel adjacent the control unit is determined. This will all become more apparent when the schematic wiring diagram of Figure 19 for the pickups and control units is described.

In addition to the control elements already mentioned on the control panel, there is an actuator 178 whereby the spinning of the wheel can be accomplished and also the braking thereof. It will be noted that on the control panel, as shown in Figure 6, there are the words "Spin" and "Brake." When the upper projection on the actuator is turned to the position "Spin," the spinner ram will be operated to bring the spinners up into engagement with the wheel and then the motors operated so the wheel will be given a spin. The revolutions per minute of rotation of the wheel will be indicated on the meter 173. When the actuator 178 is moved so the lower projection indicates "Brake," then the spinner ram will be so operated under a high air pressure that the brake shoe will be brought into engagement with the spinning wheel, and since this spinning wheel engages the tire of a wheel, the wheel will be braked. The actuator 178 controls two sets of switches in the box 171, one for spinning and the other for braking. On the control unit wiring diagram of Figure 20 these sets are indicated by the nomenclature SCS-S and SCS-B.

The stroboscopic lamp L of the control unit is arranged to be fired by the unbalancing forces being detected by a pickup. The lamp will be fired once for every revolution of the wheel, all of which will become apparent from the electrical hookup to be described and shown in Figures 19, 20 and 21.

As has already been mentioned, there will be dollies and control units for the rear wheels of the vehicle in order to produce a balancing apparatus by means of which all the wheels of a vehicle can be balanced in the shortest possible time while the wheels remain on the vehicle. Since these rear wheels are driven directly by the engine of the vehicle and can also be braked, it need not be necessary to provide spinning motors or braking means for the wheels. However, since only one wheel is to be spun at a time to detect unbalance, the spinners on the dollies will be provided with dummies for blocking a wheel when the other wheel is spun. Otherwise, the dollies will be the same as those described for the front. The spinning and braking of the rear wheels can all be accomplished by a driver in the vehicle.

In order that this driver may know when to perform spinning and braking for the operators which will be at the control units, a driver's control unit will be provided. This unit is indicated in Figure 3 by the letters DC and mounted on a post 179. This unit and post is positioned slightly forward of the driver's compartment of the vehicle and on the driver's side so as to be readily visible.

The panel for the driver's control unit is shown in Figure 18. It has unbalance meters 180 and 181. These are connected in the circuits in such a manner that they will indicate to the driver in the vehicle the conditions as those being indicated to the unbalancing operator at the rear control units. The panel will also have two green signal lights 182 and 183 for indicating to the driver which rear wheel control unit is being controlled by the balancing operator. Light 182 is for left rear wheel and light 183 is for the right rear wheel, all as referred to by proper wording as shown.

In order to better understand the hookups of the various structures of the two dollies, together with circuits of the control units therefor, reference is now had to Figures 19, 20 and 21. The wiring diagram shown in Figure 19 is schematic and discloses the manner in which the two pickups P in the housings 50 of the vehicle lifts VL and VL' are connected into the electronic control units, and also the driver unbalance meters when these meters are used, as for example, in the balancing of rear wheels. The electronic control units are indicated by blocks with the general designation CU and CU', CU being the right hand unit and CU' the left hand unit as viewed with respect to an occupant in the vehicle. These electronic control units will also have embodied therein preamplifiers for amplifying the signal which will be picked up by a pickup when dynamic unbalance is being determined. To simplify the wiring diagram, the preamplifier is shown as a separate block in the diagram. These preamplifiers are not used when static unbalance is being determined. In Figure 19 the two control selector levers 177 are shown whereby the circuits may be selectively connected for static and dynamic unbalance, these levers already having been indicated as being mounted on the operator's control panels of the control units.

From the wiring diagram shown in Figure 19 it will be seen that when the control lever 177 for the right side conrol unit CU is moved to the "Sta." position, it will close a circuit which will result in the pickup P on the right side of the vehicle and adjacent the right wheel being connected to terminals indicated at X and Y of the electronic circuit in the control unit. The vibrations of the right side pickup will then be caused to fire the Strobotron lamp L as will become apparent. The preamplifier part of the circuit will be by-passed. When the control lever 177 of the right hand control unit is thrown to the "Dyn." position, then the preamplifier of the electronic circuit of the control CU will be placed in the circuit and the vibrations which are being picked up by the circuit and the vibrations which are being picked up by the left side pickup P will then be preamplified before being fed into the rest of the circuit to result in firing of the Strobotron lamp L.

When the selector lever 177 for the left hand electronic control unit is operated and placed at the "Sta." position, as indicated, then the electronic control unit CU' will be connected to the left side pickup P, as will be apparent, and the preamplifier associated with the electronic circuit of the control unit CU' will be by-passed. By throwing the selector lever 177 of the left hand control unit CU' to the "Dyn." position, then the right side pickup P will be connected to the electronic circuit of control unit CU' on the left side and in this circuit will be the preamplifier.

Also indicated in the schematic hookup of Figure 19 is the manner of connecting the two unbalance meters on the driver's control unit DC, these meters being indicated at 180 and 181, as already referred to in connection with the driver's control unit. The connections for the two unbalance meters 180 and 181 are shown in dashed lines, since they will be employed only in the hookups of unbalancing units associated with the rear wheels. In other words, the schematic hookup shown in full lines in Figure 19 will be used for the front wheels and when the hookup is employed for the rear wheels there will be the additional two unbalance meters 180 and 181 so that the driver, who will do the wheel spinning with the vehicle engine, will have knowledge of the magnitude of the unbalancing forces.

It is believed to be apparent from the schematic hookup of Figure 19 that when static unbalance of a wheel is to be determined, the unbalancing forces causing induced currets in the pickup adjacent the wheel will be the ones employed. When dynamic unbalance of a wheel is to be determined, the unbalancing forces causing induced currents in the pickup remote from the wheel will be the ones employed. These latter induced currents will be preamplified because such currents will be minute, due to the remoteness of the pickup from the wheel. These hookups for the two pickups, together with the resilient supporting of the vehicle at spaced points, are very important features of our invention.

In Figure 20 the electronic hookup for each control unit is disclosed. In the hookup the terminals X and Y correspond to the terminals X and Y in the schematic hookup of Figure 19. The control unit circuit includes not only the current in the designated control unit block of Figure 19, but also the preamplifier. It will further be seen that the various switches for the spinning and braking of the wheel, the raising and lowering of the venicle lift, in addition to the dynamic and static selector lever are shown. The lift control switch has already been referred to as LCS and it will be controlled by the up and down vehicle lift control lever 176. The spin and brake control lever is indicated at 178 and it is by means of this control lever that the braking switches SCS-B and the spinning switches SCS-S are controlled. In this circuit there is also shown the unbalance and R. P. M. meters 172 and 173 and the manner in which they are connected in the circuits, these meters being on the control panel of the control unit, as shown in Figure 6 which has already been described. There is also shown in connection with this wiring circuit for the control unit, one unbalance meter on the driver's panel which will be part of the hookup of the control unit employed in connection with balancing of rear wheels.

To anyone skilled in the art it is not believed necessary to describe all the various electrical connections in order to understand the circuits involved. However, in order to aid in understanding them, the values of the resistances as used is indicated, as is also the capacitances of the various condensers.

The preamplifier circuit employs an amplifying triode tube 184. This tube is what is known on the market as a duo triode 6SL7 tube and the elements are connected in parallel so it will act as a single triode. It is with this circuit including tube 184, that the voltages induced in the remote pickup P from vibrations remote from the wheel being balanced will be preamplified before being fed into the main circuit. In this main circuit there is another amplifying duo triode tube 185. This tube is identified on the market as a 6SL7 tube and is used in the circuit as a two-stage amplifier and the amplified voltage will be employed to cause operation of a thyratron tube 186 which acts as a trigger tube. This thyratron tube 186 is a gas filled tube and is known on the market as a 2050 tube. The thyratron tube 186, as can be seen from the connection shown, will function to trigger tube 187 and this tube in turn will trigger the high intensity flash tube L which is the stroboscopic lamp of the control unit, said lamp being a No. 316050 manufactured by Kem-Lite Laboratory. Power for the circuit will be brought in through the conductors 188 and 189 and associated with this power input will be a transformer 190 to the secondary side of which is connected a power tube 191 which will furnish the supply to the stroboscopic lamp L. Tube 191, as used, is known on the market as a 5Y3 tube. The input conductors are also connected with another transformer 192 which will furnish power to the remainder of the circuit through a power rectifier tube 193 connected to the secondary side of the transformer 192. This power rectifier tube is also a 5Y3 tube, the same as the power tube for the stroboscopic lamp.

From the circuit connections shown, it will also be seen that there is another duo triode tube 194 which is part of a bridge circuit for operating the unbalance meter 172. By means of this tube, which is a 6SL7 tube, the signal from the first stage of amplification or the preamplifier circuit will be picked up and amplified. Associated with the bridge circuit will also be a duo diode tube 195 which is known commercially as a 6H6 tube and is used in the manner as a half wave rectifier tube. The circuit will also have embodied therein and connected in the manner shown a gas tube 196 which is used as a filtering and voltage regulator tube. The particular tube employed is known as OD3/VR150-30. The circuit also embodies a second thyratron tube 197 and this tube will act to measure the speed, it being noted that the R. P. M. meter 173 is a frequency measuring meter and is connected in the circuit with this tube. The tube is known on the market as a 2050 tube, the same as the thyratron tube 186 previously referred to.

The voltage which is induced into a pickup assembly will, by means of the hookup shown in Figure 20, cause firing of the stroboscopic lamp once each cycle of the vibration force. As already mentioned, the firing of the lamp L is accomplished by the already mentioned amplifier tube 185 and the thyratron or trigger tube 186. If the selector lever 177 is set on "Static" the voltage which is induced into the pickup adjacent the rotating wheel will come directly into the X and Y terminals of the circuit shown in Figure 20 and the preamplifing circuit, including the tube 184, will be by-passed. However, if the selector lever 177 is set on "Dynamic" the induced voltage which is picked up by the remote pickup, that is, the pickup farthest from the rotating wheel, will be first amplified by the circuit including the tube 184 before being fed into the circuit including the amplifying tube 185.

The induced voltage which is coming from a pickup assembly must first be integrated in order to get a voltage which will be proportioned to displacement and not to velocity. This is accomplished by the integrating circuit associated with the amplifying tube 185 and consisting of the resistance shown, together with the condenser, which it will be noted is grounded with the ground side being connected to the cathode of the amplifying tube 185. Both plates in the tube 185 receive voltage regulated power from the voltage regulator tube 196. A potential divider to properly bias the second half of the amplifying tube is provided by the resistances and connections shown. The thyratron or trigger tube 187, which will control the firing of the stroboscopic lamp L, had amplified periodic signals from the amplifying tube 185 impressed on one of its grids, the connections being through the condenser and resistances shown. The cathode of the thyratron tube is biased by being connected through the resistances shown. The plate is connected to the trigger tube 187 with suitable condensers and resistances provided in the connecting circuit, it being noted that the condenser is susceptible of being charged with power from the rectifier tube 193. When the signal from a pickup assembly P has been integrated and amplified it will be impressed on the indicated grid of the thyratron tube 186. When the grid potential of this tube reaches a critical value, the tube fires and the condensers connected therewith will then be discharged. This causes a sharp potential drop and such will result in the firing of the trigger tube 187 and when this trigger tube is caused to fire, it in turn will fire the stroboscopic lamp L.

The amplitude measuring portion of the circuit is a well known arrangement and comprises the rectifying tube 195, already mentioned, and the vacuum tube 194, also already mentioned, together with an integrating circuit associated with the amplifying tube and a bridge circuit including the necessary resistances associated with the plate resistances of the tube 194. With this bridge circuit and amplifying tube together with the integrating circuit, and being connected across the bridge can indicate the amplitude of the vibrations causing the induced voltages in the pickup assembly. It will be noted, in connection with the integrating and bridge circuits, that power is received from the voltage regulator tube 196.

It will also be noted from the circuit that tube 197 has its plate and grids so connected with the R. P. M. meter 173 (which is a frequency measuring meter receiving power from the voltage regulator) that the frequency of the vibrations causing the induced voltages in the pickup assemblies will be measured. By measuring the frequency of vibrations the speed of rotation of the wheel which is causing the vibrations can become known since there will be a voltage induced once every revolution of the rotating wheel.

In order to simplify the wiring diagram of Figure 20, the connections to the heater elements of various tubes, namely, tubes 184, 185, 194 and 195, 186 and 197, are not shown. However, each of the heater element terminal connections of a tube is indicated by the small letter z and these terminals are connected to the terminals of a secondary winding of the transformer 192, also indicated by the capital letter Z.

Figure 21 discloses a simplified wiring diagram for the dolly control circuit, which diagram might be more accurately described as a functional wiring diagram and includes only the solenoid control valves, switches and other functional items embodied in the dolly and the control unit. Many of the switches and other elements shown in this functional diagram have already been referred to, whereas the remainder are referred to for the first time. In order that all the elements shown in the diagram may be readily identified, the nomenclature already set forth and the other nomenclature involved, together with the definition and purpose thereof, is here listed. In selecting the letters for the nomenclature, it has been done in a manner to best indicate the function of the element involved:

Nomenclature

CR—control relay (solenoid and switches in switch box 106)
CUR—control unit relay (for signal light control)
LCS—vehicle lift control switch (operated by lever 176)
SCS-S—spinner control switches which operate in "Spin" position of actuator 178
SCS-B—spinner control switches which operate in "Brake" position of actuator 178
VLLR—vehicle lift latch release switch (in switch box 106)
COS—contact operated switch (operates when spinner contacts tire)
SC—spinner controller switch
BS—brake solenoid (for control member 99 in housing 90)
DCS and DCSB—dolly control switches operated by weight of vehicle
LSF—limit switch for automatically centering spinner under tire (in switch box 106)
HCS—tire height control switch (in switch box 106)
VLIL and VLILB—vehicle lift interlock switches (in switch box 106) operated when vehicle lift is raised

Nomenclature—Continued

VLUV—vehicle lift intake "Up" valve (part of solenoid valve assembly SVA)

VLDV—vehicle lift exhaust "Down" valve (part of solenoid valve assembly SVA)

SLDV—spinner lift exhaust "Down" valve (part of solenoid valve assembly SVA)

SLUVS—spinner lift intake "Up" valve which admits "Low" pressure for spinning wheel (part of solenoid valve assembly SVA)

SLUVB—spinner lift intake "Up" valve which admits "High" pressure for braking wheel (part of solenoid valve assembly SVA)

DCFV—dolly control cylinder intake "Forward" valve (part of solenoid valve assembly SVA)

DCRV—dolly control cylinder exhaust "Return" valve (part of solenoid valve assembly SVA)

The control relay CR in the switch box 106 involves a single coil which is indicated as CR and also six switches indicated by CR plus numbers to differentiate them, said switches being controlled by the single coil of the solenoid. In other instances, where a solenoid coil is employed to operate several switches, the coil and the switches are all indicated by the same nomenclature. Where there is more than one switch indicated by the same nomenclature, they are distinguished by a number.

In the wiring diagram of Figure 21 the various switches, valves, etc., are shown in what is termed their "normal condition," when no vehicle is on the rack and unbalance is not being determined. As to the particular elements, this normal condition is as follows: The vehicle lift interlock VLIL is normal when the vehicle lift VL or VL′ on the dolly is down. The solenoid coil for the control relay CR is normally not energized and under such conditions the various CR switches controlled by this solenoid are in the positions shown in Figure 21, and it will be noted that some of them are open and some closed. The vehicle lift control switch LCS is normal when the lever 176 on the operator's panel which controls it is set for "Down." Both spinner control switch contacts SCB-S and SCS-V have a so-called normal position when the lever 178 on the driver's control panel is in it central position, neither up toward "Spin" nor down toward "Brake." The tire height control switch HCS is normal (closed) when the spinner is down. The brake solenoid BS is normal when not energized and this occurs as long as the actuator 178 on the control panel is not in "Brake" position. The contact operated switch COS is normal (open) when the spinning wheel does not contact the tire. The magnetic spinner control SC is considered normal when its coil is not being energized. The dolly control switch DCS and the other dolly control switches DCSB are considered normal when there is no weight on the tubular supports 31 and 32 of the rack. The switch DCS under such conditions will be open and switch DSCB No. 1 will be open and the other DCSB No. 2 closed. The switches SCS-B and SCS-S are gang switches (as illustrated in the wiring diagram of Figure 20) and are normal when the actuator 178 is in the central position when neither "Spin" nor "Brake" positions are operative. The solenoid controlled valves are normal when they are de-energized. In other words, all valves are closed. All valves are open when their solenoids are energized.

Operations to determine unbalance of wheels

From the description of the balancing apparatus including the details of the structure involved and the various wiring hookups of the elements, including the solenoid operated valves, switches, etc., it will be possible to drive the vehicle onto the rack and quickly raise the vehicle so that parts thereof will be supported on resilient supports. Before the vehicle is driven onto the rack, the elements including the valves, switches, etc. will be in their normal condition, which condition has already been defined. If all four wheels of the vehicle are going to be balanced there will be, besides the dollies and control units at the front of the rack, similar dollies and control units at the rear of the rack for the wheels at the rear end of the vehicle. As already mentioned, however, there will not be any spinners for the rear wheels since these wheels can be rotated by the engine of the vehicle. However, it will be necessary to use the dummy spinners for holding one wheel braked while the other wheel is being rotated by the engine through the differential.

When the vehicle is driven onto the rack, the front wheels thereof will assume position between and rest on the two tubular cross supports 31 and 32 and when the weight of the vehicle comes onto these supports the tubular support 32 will be pushed downwardly a short distance against the action of the spring 163 (clearly shown in Figure 12). This movement of the tubular support 32 is permitted by the slot 162. When the tubular support 32 is moved downwardly, the two end cross plates 160 will have swinging movement and as a result will move the pivotally mounted actuators 166 without relative movement, with the result that the plungers 156 will be moved downwardly, allowing downward movement of the discs 158. Each disc controls the two switches DCS and DCSB related to each dolly. The single switch DCS will be closed and the two switches DCSB will be reversed from the condition shown in the functional diagram of Figure 21, that is, DCSB No. 1 will be closed and DCSB No. 2 will be opened. It will be noted that the DCSB No. 1 switch in the circuit for the DCFV solenoid controlled valve (inlet valve for dolly cylinder 41) will be the one that is opened and the DCSB No. 2 switch in the circuit for controlling the DCFV solenoid controlled valve (exhaust valve for dolly cylinder 41) will be closed. Consequently, the inlet valve DCFV will be opened and exhaust valve DCRV closed with the result that air will be admitted to cylinder 41 of the dolly so as to operate upon the piston 42 of said cylinder and cause the dolly to be moved outwardly from its central position to the desired position adjacent the wheel, that is, a position where the spinner wheel will be positioned directly below a tire. When this position is reached, the air to the cylinder 41 will be automatically cut off by finger 139 engaging the inner edge of the tire and causing the double switch LSF to be operated. From the functional diagram of Figure 21 it will be noted that LSF No. 1 switch in the circuit for the DCFV solenoid controlled valve is opened, whereas the other LSF No. 2 switch is closed, this switch being in the circuit including the height control switch HCS, the solenoid for the control relay CR and the vehicle interlock switch VLIL, all of which are closed. Since air is no longer admitted to cylinder 41, each dolly will then stop at the proper position with the spinner wheel directly beneath the tire.

When the LSF No. 1 switch is closed, the solenoid coil CR for the control relay is still not energized because manually controlled switch LCS No. 3 actuated by the control lever 176 has not been opened by being set for "Up." When this is done and the CR coil is energized, all CR switches will be controlled, with the ones shown open in Figure 21 being closed and those shown closed being open. By the closing of the CR No. 6 switch, a shunt circuit will be set up around the DCS, LSF No. 1 and VLIL No. 2 switches in the CR solenoid coil circuit so that opening of any of these switches will not de-energize the CR coil.

When the CR coil is energized as a result of operating the LCS switch lever 176 to "Up," the CR No. 2 switch forming part of the circuit of the solenoid controlled valve VLUV will be closed with the result that the VLUV valve will be opened and air under pressure will thus be admitted to the vehicle lift cylinder VL or VL′, whichever one is being controlled by the operator. If there is an operator at each control unit, then by throwing both the control levers 176 to "Up," the vehicle will be raised by means of the vehicle lifts and the extent of raising will be sufficient to free both the wheels which are to be balanced from the tubular supports so they can be rotated by the spinners when desired. By lifting the wheels of the vehicle off the tubular supports, the spring 163 (see Figure 12) will expand and move the tubular support 31 upwardly with the result that the two switches DCS and DCSB will again assume their normal condition (shown in Figure 21) corresponding to that when the vehicle was not driven on the rack.

As a vehicle lift initially operates to raise a wheel off the rack, the VLIL and the VLILB switches will be operated, due to the fact that lug 117 on the ram moves upwardly with the ram and the arm 116 (see Figure 10) is thereby freed so the spring 115 can be effective to control the two aforementioned switches. VLIL No. 2 switch will be opened, as also will be the single VLILB switch. The VLIL No. 1 switch will be closed. The opening of the VLIL No. 2 switch will not affect the energization of the CR coil because the circuit remains established through the CR No. 6 switch. As the ram lifts the vehicle, latch 105 ratchets over the teeth on the ram. It will be noted that this latch 105, as best seen in Figure 10, is under the control of the spring 112 and since the solenoid VLLR (solenoid) is not energized the latch can be effective to hold at any time.

As already noted, the CR coil was energized when the LCS switch was manually controlled by the lever 176 being moved to "Up" position to thereby cause the vehicle lift to operate. The energization of the CR coil also resulted in all the CR switches being operated to positions opposite those shown in Figure 21. Consequently the CR No. 5 switch was closed. The closing of this switch closed the circuit for the SLUVB solenoid controlled valve which opened said valve and permitted air under pressure to flow to the cylinder 79 of the spinner lift. Consequently a piston of the spinner lift will be moved upwardly in the cylinder and the spinner will follow up the wheel as the vehicle lift operates. When the vehicle lift has raised the vehicle to a position where the upward movement of the spinner lift tensions the spring 123 and chain 122 (see Figure 4), the control arm 121 will be operated and consequently the height control switch HCS will be operated. It will be recalled that this height control switch is in the box and under the control of an arm 119 which is moved by the arm 121 (see Figures 10 and 11). The height control switch is a single switch and it is opened by movement of the arm 121. Referring back to the diagram of Figure 21, it will be seen that this height control switch HCS is in the circuit of the CR coil. Therefore, the opening of the height control switch will break the circuit for the CR coil and this coil will be de-energized. Upon de-energization of the CR coil, all the CR switches shown in Figure 21 will be controlled and they will be returned to their condition shown in Figure 21. When this happens the vehicle lift will no longer be operated, nor will the spinner lift. When the CR No. 2 switch becomes open, the vehicle lift "Up" valve VLUV will be closed and the VLDV valve, which exhausts the vehicle lift cylinder, will be opened as a result of its solenoid being energized with the CR No. 3 switch coming to closed position. The vehicle, however, will remain held lifted, notwithstanding that the air from the vehicle lift cylinder is exhausted because the latch 105 is effective to engage one of the teeth on the ram and hold it in its vehicle lifted position.

When the height control switch is opened to cause de-energization of the CR coil and the return of all the CR switches to the position shown in the diagram of Figure 21, the CR No. 5 switch will be open and consequently the spinner lift "Up" valve SLUVB will be closed. With the opening of the CR No. 5 switch, there will be a simultaneous closing of the CR No. 4 switch and this will energize the circuit for the solenoid controlled exhaust valve of the spinner SLDV. By reference to Figure 21, it will be seen that the closed circuit for the SLDV valve is through the closed SCS-B No. 1 switch, the SCS-S No. 1 switch and the previously closed LCS No. 2 switch and also previously closed VLIL No. 1 switch (this switch was closed when the vehicle lift ram initially moved up to raise the vehicle). The spinner is now down to its normal position as shown in Figures 4 and 5.

With the vehicle raised, the operations can be carried out for determining the static and dynamic unbalance of the wheel. In doing this it is assumed that the vehicle has been raised by both vehicle lifts, with operators at both sides of the vehicle for controlling the manual control elements on the two control units CU and CU'. In determining the unbalance of a wheel, it will be done by the operator at the control unit which is adjacent said wheel.

Let it be assumed that the operator desires to determine the static unbalance of the wheel adjacent his control unit. To perform operations to determine the unbalance it will be necessary to spin the wheel and bring it up to a relatively high speed, somewhere in the neighborhood of 1200 revolutions per minute. To spin the wheel, the actuator 178 is pushed to "Spin" position from its central neutral position. This will result in the SCS-S switches being controlled. There will be no change in the SCS-B switches because of the manner of operation of the actuator 178, all of which can be understood from the wiring diagram of Figure 20. When the actuator 178 is moved upwardly, it will swing about the pivot 178' and thus act downwardly on the element 178". The element 178''' will not be operated because of the stop which is associated with the element. The element 178" also has a stop associated with it, so when the actuator 178 is thrown to "Brake" from its central position, the SCS-S switches will not be changed from their indicated normal positions in Figure 20, but this movement of the actuator will throw the SCS-B switches.

When the actuator 178 is thrown to "Spin" and the SCS-S switches are operated, it will be noted from Figure 21 that the SCS-S No. 1 switch will be opened, the SCS-S No. 2 switch closed and the SCS-S No. 3 switch closed. The closing of this latter switch will energize the solenoid of the valve SLUVS, which valve is constructed to admit low air pressure to the spinner lift cylinder during spinning. Consequently the spinner lift will be moved upwardly to move the spinning wheel into engagement with the tire. When the spinning wheel contacts the tire, the contact switch COS will be operated in a manner already explained in connection with the structure shown in Figure 16. When the spinner wheel contacts the tire it will push downwardly on the two mounting arms 75 and 76, with the result that the plunger 89, shown in Figures 15 and 16, will be moved downwardly slightly, thereby closing the COS switch. The plunger 89 can only move a limited distance downwardly, due to the fact that the control element 99 is in a position where the opening 100 therein is not aligned with the plunger, this all resulting from the action of the spring 92 and the de-energized condition of the solenoid BS. The closing of the COS switch, as can be seen in the diagram of Figure 21, will result in the coil SC, which is the spinner controller coil, being energized. This will result in both the SC No. 1 switch and the SC No. 2 switch being closed. The SC No. 2 switch controls the motor circuit for the two spinning motors 72 and 73 and these, upon energization, will rotate the spinning wheel with the result that the vehicle wheel will be rotated at a high rate of speed. The closing of the SC No. 1 switch is solely for the purpose of establishing a circuit around the COS switch, as it could be possible during spinning of the wheel that the COS switch could pop open and closed by a "jumping" of the spinning wheel on the tire surface, due to some unevenly worn spots on the tire. The closing of the SCS-S No. 2 switch will place the red and green lights 174 and 175 in circuit and cause them to be illuminated. It will be noted from Figure 21 that the green light 174 is on the control panel which is being controlled by the operator to perform unbalancing conditions, whereas the red light 175 is the one on the control panel on the opposite side of the vehicle. Thus, the operator on one control panel will know that the other operator is performing balancing operations. After the wheel has been rotated up to the desired speed, the spinning control actuator 178 can be returned to a central position and when this happens the spinner lift cylinder will be exhausted and the spinner will then move downwardly away from the tire and the wheel will then run free. The reason that the spinner lift will be lowered when the actuator 178 is returned to central position is because of the returning of the SCS–S switches to the positions which are shown in the diagram of Figure 21. The inlet valve to the spinner lift will be closed and the exhaust valve will be opened.

Once the lights 174 and 175 are lighted by the closing of the SCS–S No. 2 switch they will remain lighted until braking occurs, regardless of the condition of the SCS–S No. 2 switch. It will be noted from Figure 21 that when this switch is closed the control unit relay coil CUR will be placed in circuit and thereby energized. This energization of the coil will cause the CUR switch to be closed, thereby establishing a shunt circuit around the SCS–S No. 2 switch. This shunt circuit has in it a SCS–B switch identified as No. 2 and it is normally closed as long as the actuator 178 is not thrown to "Brake" position. Whenever the SCS–B No. 2 switch is opened by performing braking, the red and green lights, lights 174 and 175, will go off.

With the wheels spinning, the operator will view the unbalance meter 172 and the speed meter 173 on the control panel. Generally the wheel is spun at a higher rate than necessary and then allowed to coast down. If static unbalance is to be determined, the selector lever 177 will be left at its "Static" position and placed there if at its "Dynamic" position. Vibrations will be picked up by the adjacent pickup in the pickup P in the vehicle lift adjacent the spinning wheel. There will be no preamplification of the induced currents caused by the vibration forces being picked up. The stroboscopic lamp L will be flashing once each revolution of the wheel and the light from the flashing lamp will be directed onto the rotating wheel. The operator can use a check point on the wheel such as the valve stem, for example. When the wheel is rotating at the speed which will give the greatest unbalance reading (this speed is called the critical speed), the operator will note the position of the valve stem under the flashing light, this position being readily noticeable because the valve stem will look as if it is standing still, as it is only visible under a flash of the light which is occurring once each revolution. After noting the position of the check point, which could be the valve stem, the operator can now stop the wheel and correct the static unbalance condition of the wheel by the adding of a weight.

To perform braking, the operator need only throw the actuator 178 to the "Brake" position. When this is done the SCS–B switches will all be controlled and they will be opposite that shown in the diagram of Figure 21. The SCS–B No. 1 switch will be opened and this will result in the spinner lift exhaust valve SLDV becoming closed. The SCS–B No. 3 switch will become closed and this will place the SLUVB solenoid controlled valve in circuit and open it, with the result that the spinner lift will be operated under a higher air pressure than would be possible when the SLUVS inlet valve is opened. With the closing of the SCS–B No. 3 switch, the solenoid BS will be energized, as can be seen in the wiring diagram, Figure 21. The energization of this solenoid will result in the operation of the control element 99, as shown in Figures 15 and 16, and the opening 100 in this control element will be moved to the position shown in Figure 15. Consequently the plunger 89 can now be moved downwardly, when the spinner wheel engages the tire, until the brake shoe 88 (Figure 14) engages the spinner wheels 74 to hold them from rotation. Thus the rotating vehicle wheel will be braked through the spinner wheel and the brake shoe operating thereon, thereby bringing the wheel to a stop. The electric motors of the spinner will not be energized during this braking, because it will be noted that the SCS–S No. 3 switch is open, having assumed such position when the actuator 178 is brought from "Spin" position back to central position.

When the vehicle wheel has been stopped, the actuator 178 is returned to central position and consequently the spinner lift is lowered. The operator will then turn the wheel to the position where he saw the valve stem under the light from the stroboscope while the wheel was rotating. When the wheel is in this position he will then choose a suitable weight and mount it on the rim of the vehicle wheel at the top thereof. The weight selected will depend upon the extent of unbalance which is shown by the unbalance meter, the greater the unbalance reading, the greater will have to be the weight employed to correct the unbalance. A little experience in balancing will enable the operator to make a fairly close selection of the weight to correct the unbalance when he reads the unbalance meter. If a check should be desired to ascertain if he has put on approximately the right weight, he can re-spin the wheel and make his check. The reason that the weight is placed at the top of the wheel is that the vibration which has been "picked up" is caused by the unbalance. The stroboscope flashes when the unbalance is at the bottom when the wheel is rotating at a critical speed. For a more detailed procedure of balancing operations, reference is made to Merrill et al. Patent No. 2,383,405, issued April 21, 1945.

To now determine the dynamic unbalance of the wheel, the operator will again cause the wheel to be spun by throwing the actuator 178 to the "Spin" position. This will bring up the spinner lift to engage the spinner wheel with the tire, at which time the spinner controller will operate and cause the motors to rotate the wheel to accomplish spinning, all as previously described. To check dynamic unbalance, the operator will throw the selector lever 177 to dynamic position. This will result in the preamplifier circuit being connected in the electronic circuit of the control unit, as is well illustrated in the schematic view of Figure 19. Also, the throwing of the lever to dynamic position will cut out the pickup P which is adjacent the spinning wheel and connect into the electronic circuit of the pickup P which is adjacent the wheel on the opposite side of the vehicle. The induced voltages caused by the vibrations in this opposite pickup P will be fed into the electronic circuit, first being amplified by the preamplifier tube 184 and circuit. The induced voltages by the electronic hookup will result in the stroboscopic lamp L to flash each revolution of the wheel. The valve stem will now be viewed by the operator under this lamp flashing and after the wheel has been spun to the desired speed and allowed to run free by turning the actuator 178 to its central position, the operator will watch the meters on the control panel. When the unbalance meter shows the greatest vibrations, the operator will note the position of the wheel under the light from the lamp L and will then brake the wheel in a manner already described, which is accomplished by merely moving the actuator 178 to the "Brake" position. When the wheel stops, the spinner will be caused to become lowered and then the operator will move the wheel so the valve stem is at the position it had under the light from the stroboscope when the unbalance meter showed the greatest reading.

Since the operator is determining dynamic unbalance, such will result from the operation of a couple, that is, the forces causing the unbalance are acting in opposite directions about a couple arm. The so-called "heavy" portions (couple forces) of the dynamic unbalance are at the outside bottom and the inside top parts of the wheel. Consequently, to correct this unbalance, it is necessary to add two corrective weights and these must be added at the outside top and the inside bottom of the wheel rim. As the operator acquires skill, he will know substantially what size of weights should be added to correct the dynamic unbalance which is shown by the unbalance meter. He already knows what the critical speed is that resulted in the greatest unbalance. If he wants to check his correction, he can again rotate the wheel up to the critical speed and make a check on the unbalance meter. If it shows that he has not selected the necessary weight to correct the unbalance, he can change the weights and then run a re-check if thought desirable. If very fine balances are desired, of course it may be necessary to make several checks.

In correcting dynamic unbalance, it may be that such correction has, from a practical standpoint as far as the disclosed machine is concerned, recreated some static unbalance. If it is desired to again check the static unbalance, it can be done in a manner already described, that is, spinning the wheel and then throwing the actuator to the "Static" position.

After one operator completes his balancing operations, the operator on the other side of the vehicle can perform the balancing operations for the opposite wheel and this will be done in the manner as already described. After the wheels have been balanced, the vehicle can be lowered onto the rack so it can be driven off. In balancing the rear wheels, the same units will be used, including the same circuits. However, with respect to the rear wheels, it will not be necessary to have any spinners as the spinning can be done from the engine of the vehicle with an operator in the operator's compartment. It will not be necessary to have any motor circuit or unit (shown in Figures 15 and 16) and therefore these circuits will be eliminated from Figure 21 for the two control units. There will be added, however, to the circuit of Figure 21, an additional switch which is indicated as SCS–B No. 4 switch controlled by the spinning and braking actuator 178 on the opposite control panel. The sole purpose of this switch is to control the light on the driver's control panel DC. The light will be either 182 or 183, depending upon whether it is in the control circuit for the right or left wheel. Whenever an operator wishes to spin his wheel, he momentarily throws his spinner control switch SCS to "Spin" position. However, the corresponding signal light on the driver's panel will not go on unless the opposite operator's spinner control switch is in "Brake" position. When one of the lights lights up on the driver's panel, the driver engages the engine power to the rear wheels. However, the "dummy" spinner on the side opposite the operator is up against the tire, preventing it from rotating; therefore the wheel, the unbalance of which is to be determined, will be spun through the differential. When the operator wishes to have his wheel stopped, he throws his spinner control switch 178 to "Brake" position. This extinguishes the light on the driver's panel and then the driver knows he should disengage the engine power from the rear wheels. The rotating wheel will be stopped when the "dummy" spinner contacts it or, if no front wheels are being checked for unbalance at the same time, the driver may brake it to a stop by applying pressure on the brake pedal.

It will be noted that static unbalance is being determined from vibrations which are picked up close to the wheel, the static unbalance of which is to be determined, whereas the dynamic unbalance is determined by a pickup which is remote from the wheel, the dynamic unbalance of which is to be determined. To carry out the balancing it is necessary to have the vehicle supported by proper supports (shown as resilient supports) to determine both the static and dynamic unbalance and there must be two pickups in spaced relation. These pickups, however, need not (as shown) be embodied in any of the resilient supports, but it is convenient to have them so mounted. The static unbalance of a wheel can be determined by having the pickup close to the wheel. Since a dynamic unbalance is caused by forces acting as a couple, then it is these forces which will be creating vibrations at some distance from the wheel, particularly when the wheel is supported on a resilient support closely adjacent thereto. This close resilient support acts as a fulcrum and as a dynamic unbalance couple during rotation of the wheel and the effect of this couple acts through the fulcrum and can be picked up on the opposite side of the fulcrum from the rotating wheel creating the couple from the dynamic unbalance.

After all balancing is accomplished, the vehicle can be lowered back onto the rack so it can be driven off. To get the vehicle down, all that needs to be done is move the vehicle lift control lever to the "Down" position. This will result in the LCS switches being placed in the condition shown in Figure 21. When this occurs the VLLR (solenoid) coil becomes energized so as to act with a force to tend to pull the latch to released position through the strong spring 111 (see Figure 10). However, this spring 111 will only be tensioned by the solenoid being energized. The conditioning of the LCS switches to the position shown in Figure 21 results in the LCS No. 1 switch being closed and with the VLIL No. 1 switch already closed the circuit to the vehicle lift valve VLUV will be closed. The vehicle exhaust valve VLDV will be closed, due to its circuit being broken by the opening of the LSC No. 3 switch. Consequently air under pressure will be admitted to the vehicle lift cylinder and it will then act on the piston therein to raise the weight of the vehicle off the latch 105. When this is done the latch will be automatically pulled by the action of the already tensioned spring 111. When the latch is released, it will operate the VLLR switches and they will then become reversed from the condition shown in Figure 21. The closing of the VLLR No. 2 switch will open the exhaust valve to the vehicle lift and the opening of the VLLR No. 1 switch will result in the VLUV valve being closed. Consequently the vehicle lift will be exhausted and the vehicle lowered. When the lift lug 117 engages arm 116 as the ram of the vehicle lift approaches full "Down" position, the VLIL and the VLILB switches will then be reconditioned to the position shown in Figure 21. When the vehicle has been lowered down onto the tubular cross supports and then subsequently driven off the rack, the DSC and the DCSB switches will be returned to their position shown in Figure 21. It will be noted that the VLILB switch is always open when the vehicle is up. Thus, even though the DCSB No. 2 switch becomes closed as the weight is taken off the tubular supports 31 and 32, it will never be possible for the dolly control valve DCRV to become open and exhaust the dolly control cylinder 41. When the DCSB No. 2 switch is closed by driving the vehicle off the rack, then with the VLILB switch closed, as a result of the vehicle being lowered, the DCRV valve will be automatically opened so that air in the dolly control cylinder can be exhausted and permit the springs acting on the pistons to move the dollies back to the central position.

In the drawings there has been disclosed a balancing assembly and it has been indicated how said assembly can be used to balance opposite wheels on a vehicle. One assembly can be used to balance all the wheels on a vehicle by so moving the vehicle that each companion pair of wheels will be moved so that the vehicle can be raised at said wheels and then the wheels spun and unbalance determined. Such a single assembly could be embodied in a proper design for service station or garage use. As already mentioned, two assemblies can be used and where some wheels are driven by the engine of the vehicle, dummy spinners can be employed. Where there are six wheels on a vehicle, three suitable assemblies can be employed, if rapid balancing is desired with only one position of the vehicle required.

It is further to be noted that the particular supports shown as preferred are of the resilient type. Of course more rigid support means can be used if such has the desired response to forces that the forces can be measured, and consequently the unbalance determined. When more rigid support means is employed, more sensitive pickups will probably be required and/or better amplification involved. Therefore, in using the term "resilient support" in the specification and claims, it is to be understood that such term includes structure more rigid than rubber or the like, and particularly one of any type that there can be such a response to forces that the forces can be measured and by such measurement the unbalance determined.

Thus being aware of the possibility of modifications in the particular structure shown by way of example as embodying our invention, all without departing from the fundamental principles thereof, we desire it to be understood that the scope of the invention is not to be limited in any manner except as set forth in the appended claims and where certain specific structures are called for it is intended that such also include equivalents.

What is claimed is:

1. In an apparatus for determining the nature of static and dynamic unbalance of a vehicle wheel while remaining mounted on the vehicle comprising carriage means carried by the apparatus, means supported on the carriage means for raising and resiliently supporting the vehicle so that the wheel to have its unbalance determined is free to be rotated and the vehicle is resiliently supported with a resilient support adjacent said free wheel, two pickup means carried by the carriage means and operable after the vehicle is supported for engagement with spaced parts of the vehicle which are so related to the rotating wheel as to have corresponding vibrations for detecting the vibrations transmitted to said parts by unbalancing forces as the selected wheel rotates, one of said pickups being adjacent the wheel and employable for detecting static unbalancing forces and the other of said pickups being adjacent a companion wheel on the opposite side of the vehicle from the first named wheel and employable for detecting dynamic unbalancing forces, a flashing device for viewing a check point on the first named wheel, means connected with said pickups operable by the vibrations being picked up together with control means for selectively flashing the device in synchronism with the vibrations picked up by either pickup, and means connected with the flashing device for determining and indicating the magnitude of the vibrations being picked up by either pickup.

2. In apparatus for determining the nature of static and dynamic unbalance of a vehicle wheel while remaining mounted on the vehicle comprising carriage means carried by the apparatus, means supported on the carriage means for raising and supporting the vehicle so that the wheel to have its unbalance determined is free to be rotated and the vehicle is resiliently supported with a resilient support adjacent said free wheel and the other wheel of the companion pair on the vehicle, a pickup means carried by each resilient supporting means and operable after the vehicle is supported for detecting the vibrations transmitted by unbalancing forces as the selected wheel rotates, one of said pickups being employable for detecting static unbalancing forces and the other of said pickups being employable for detecting dynamic unbalancing forces, a flashing device for viewing a check point on a wheel, means connected with said pickups operable by the vibrations being picked up together with control means for selectively flashing the device in synchronism with the vibrations picked up by either pickup, and means connected with the flashing device for determining and indicating the magnitude of the vibrations being picked up by either pickup.

3. In apparatus for determining the nature of static and dynamic unbalance of a pair of companion vehicle wheels on opposite sides of the vehicle while remaining mounted on the vehicle comprising carriage means carried by the apparatus, means supported on the carriage means for raising and supporting the vehicle so both wheels are free to be rotated and the vehicle is resiliently supported with a resilient support adjacent each free wheel, two pickup means carried by the carriage means for detecting the vibrations transmitted by unbalancing forces as each wheel rotates, the pickup adjacent a selected wheel when rotating being employable for detecting static unbalancing forces and the pickup remote from said last named wheel when rotating being employable for detecting dynamic unbalancing forces, a flashing device for viewing a check point on a wheel, means connected with said pickups operable by the vibrations being picked up together with control means for selectively flashing the device in synchronism with the vibrations picked up by either pickup, and means connected with the flashing device for determining and indicating the magnitude of the vibrations being picked up by either pickup.

4. In apparatus for determining the nature of dynamic unbalance of wheels of a vehicle while remaining mounted thereon comprising support means to which the vehicle can be moved so wheels on opposite sides will be positioned thereon, carriage means including spaced members for so lifting the vehicle chassis that the companion wheels will both be free of the support means and the vehicle will be resiliently supported, operator control means for the last named means, independent means connected with said carriage means and controllable at will for engaging and for rotating each wheel while free of the support means, a pickup means carried by each lifting member and engaging a part of the chassis for detecting vibrations transmitted by dynamic unbalancing forces when the wheel remote therefrom is rotated, a stroboscopic lamp, and means connected with each pickup detecting means for selectively operating the stroboscopic lamp in synchronization with the detected vibrations at either support caused by the unbalancing force, which lamp will have such a position adjacent the rotated wheel that a check point on the wheel can be observed under the flashing of the lamp.

5. In apparatus for determining the nature of unbalance of companion wheels at one end of and on opposite sides of a vehicle while remaining mounted thereon comprising unitary carriage structures mounted for movement in opposite directions, means for moving the carriage structures including control means therefor, lifting means mounted on each of said carriage structures for engaging a part of the end of the vehicle adjacent a wheel and lifting said wheel, means carried by the lifting means for detecting vibrations transmitted to the engaged vehicle part when either wheel is rotating, means carried by each structure for rotating the lifted wheel, said control means controlling the moving means of the unitary carriage structures so such can be moved away from and toward each other.

6. In apparatus for determining the nature of unbalance of companion wheels at one end of and on opposite sides of a vehicle while remaining mounted thereon comprising unitary carriage structures mounted for movement in opposite directions, lifting means mounted on each of said unitary structures for engaging a part of the end of the vehicle adjacent a wheel and lifting said wheel, means carried by the lifting means for detecting vibrations transmitted to the engaged vehicle part when either wheel is rotating, means carried by each structure for engaging and rotating the lifted wheel, means for controlling each of the last named means at will, and means including a moving means for each unitary carriage structure and control means therefor for controlling the movement of the unitary carriage structures in opposite directions away from normal positions adjacent each other, said last named means comprising means controlled by the wheels of the vehicle when placed in a predetermined position.

7. In apparatus for determining the nature of unbalance of companion wheels at one end of and on opposite sides of a vehicle while remaining mounted thereon comprising unitary carriage structures mounted for movement in opposite directions, lifting means mounted on each of said unitary structures for engaging a part of the end of the vehicle adjacent a wheel and lifting said wheel, means carried by the lifting means for detecting vibrations transmitted to the engaged vehicle part when either wheel is rotating, means carried by each structure for rotating the lifted wheel, operator control means for the last named means, means including moving means and control means therefor for controlling the movement of the unitary carriage structures in opposite directions away from normal positions adjacent each other, said last named means comprising means controlled by the wheels of the vehicle when placed in a predetermined position, and means comprising a control element engageable with a part of the vehicle for stopping the movement of the unitary structure at a position where said lifting means can engage a desired part of the vehicle to lift it and the wheel rotating means can engage a tire.

8. In apparatus for determining the nature of unbalance of companion wheels at one end and on opposite sides of a vehicle while remaining mounted thereon comprising unitary carriage structures mounted for movement in opposite directions, lifting means mounted on each of said unitary structures for engaging a part of the end of the vehicle adjacent a wheel and lifting said wheel, means carried by the lifting means for detecting vibrations transmitted to the engaged vehicle part when either wheel is rotating, means carried by each structure for rotating the adjacent lifted wheel, means including moving means and control means therefor for controlling the movement of the unitary carriage structures in opposite directions away from normal positions adjacent each other, said last named means comprising means controlled by the wheels of the vehicle when placed in a predetermined position, means comprising a control element engageable with a part of the vehicle for stopping the movement of the unitary structure at a position where said lifting means can engage a desired part of the vehicle to lift it and the wheel rotating means can engage a tire, and means for controlling the spinning of a wheel at will.

9. In apparatus for determining the nature of unbalance of companion wheels at one end on opposite sides of a vehicle while remaining mounted thereon comprising unitary carriage structures mounted for movement in opposite directions, means for moving said unitary carriage structures, lifting means mounted on each of said carriage structures for engaging a part of the vehicle adjacent a wheel and lifting said wheel, means carried by each structure for engaging and rotating a lifted wheel and for braking said wheel, means for controlling the last named means at will, control means for the moving means of the carriage structures for controlling the movement of said structures away from and toward each other by the moving of the vehicle so its wheels are at a predetermined resting place or the removement therefrom, and said control means including means for automatically stopping the movement of the structures away from each other when a predetermined position with respect to a wheel is reached.

10. In apparatus for determining the nature of unbalance of companion wheels at one end and on opposite sides of a vehicle while remaining mounted thereon comprising a pair of spaced resilient supports, lifting means for raising the vehicle and supporting it on said spaced resilient supports adjacent said one end, operator controlled means for said last named means, means carried by each support and movable therewith to engage a vehicle part for detecting vibrations produced by a rotating wheel, a flashing device, and means connecting the flashing device and the detecting means and controllable at will for selectively operating the flashing device by the vibrations detected by either detecting means.

11. In an apparatus for determining the nature of static and dynamic unbalance of a vehicle wheel while remaining mounted on the vehicle comprising carriage means carried by the apparatus, means supported on the carriage means for raising and resiliently supporting the vehicle so that the wheel to have its unbalance determined is free to be rotated and the vehicle is resiliently supported with a resilient support adjacent said free wheel, two pickup means carried by the carriage means and operable after the vehicle is supported for engagement with spaced parts of the vehicle which are so related to the rotating wheel as to have corresponding vibrations for detecting the vibrations transmitted to said parts by unbalancing forces as the selected wheel rotates, one of said pickups being adjacent the wheel and employable for detecting static unbalancing forces and the other of said pickups being adjacent a companion wheel on the opposite side of the vehicle from the first named wheel and employable for detecting dynamic unbalancing forces, means for locating the point of unbalance on said first named wheel, and means connected with said pick-ups for determining and indicating the magnitude of the vibrations being picked up by either pick-up.

References Cited in the file of this patent

UNITED STATES PATENTS

| | | |
|---|---|---|
| 2,023,244 | Schnaitter | Dec. 3, 1935 |
| 2,301,291 | Kolesnik | Nov. 10, 1942 |
| 2,363,316 | Hagg | Nov. 21, 1944 |
| 2,383,405 | Merrill et al. | Aug. 21, 1945 |
| 2,526,484 | Jacobsen et al. | Oct. 17, 1950 |
| 2,539,618 | Good et al. | Jan. 30, 1951 |
| 2,547,764 | Lindenberg et al. | Apr. 3, 1951 |